US008894963B2

(12) United States Patent
Sue et al.

(10) Patent No.: US 8,894,963 B2
(45) Date of Patent: Nov. 25, 2014

(54) DISPERSION AND RETRIEVAL OF DE-BUNDLED NANOTUBES

(75) Inventors: Hung-Jue Sue, College Station, TX (US); Xi Zhang, College Station, TX (US); Riichi Nishimura, Houston, TX (US)

(73) Assignees: The Texas A&M University System, College Station, TX (US); Kaneka Texas Corporation, Houston, TX (US)

( * ) Notice: Subject to any disclaimer, the term of this patent is extended or adjusted under 35 U.S.C. 154(b) by 144 days.

(21) Appl. No.: 12/979,945

(22) Filed: Dec. 28, 2010

(65) Prior Publication Data

US 2012/0095143 A1    Apr. 19, 2012

Related U.S. Application Data

(60) Provisional application No. 61/297,986, filed on Jan. 25, 2010.

(51) Int. Cl.
*D01F 9/12* (2006.01)
*C01B 31/02* (2006.01)

(52) U.S. Cl.
CPC .......... *C01B 31/0273* (2013.01); *Y10S 977/786* (2013.01)
USPC ..................... 423/447.1; 423/445 B; 977/786

(58) Field of Classification Search
USPC ................... 423/447.1, 445 B, 460, DIG. 40; 977/786; 209/1
See application file for complete search history.

(56) References Cited

U.S. PATENT DOCUMENTS

| | | | |
|---|---|---|---|
| 2005/0154116 A1 | 7/2005 | Nagy et al. | |
| 2006/0231792 A1 | 10/2006 | Drzal et al. | |
| 2009/0035469 A1 | 2/2009 | Sue et al. | |

OTHER PUBLICATIONS

Bonard et al. "Purification and size-selection of carbon nanotubes" Advanced Materials vol. 9, Issue 10, pp. 827-831, 1997.*
PCT/US2010/062244 International Search Report and Written Opinion, Sep. 30, 2011 (11 p.).
Japanese Office Action dated Sep. 30, 2014; Japanese Application No. 2012-550001 (3 p.).
English Translation of Japanese Office Action dated Sep. 30, 2014; Japanese Application No. 2012-550001 (2 p.).

* cited by examiner

*Primary Examiner* — Richard M Rump
(74) *Attorney, Agent, or Firm* — Conley Rose, P.C.

(57) ABSTRACT

A method for dispersing nanotubes, comprising forming a nanocomposite solution with associated nanotubes and nanoplatelets, mixing a surfactant to the nanocomposite solution, separating the nanocomposite in solution, wherein the nanotubes remain suspended in the surfactant solution, and isolating the nanotubes in solution. In certain instances, the method further comprises functionalizing the nanotubes in solution.

19 Claims, 16 Drawing Sheets

A

B

DISPERSION AND RETRIEVAL OF DE-BUNDLED NANOTUBES

CROSS-REFERENCE TO RELATED APPLICATIONS

This application claims benefit under 35 USC §119 of U.S. provisional application No. 61/297,986 filed Jan. 25, 2010, entitled "Dispersion and Retrieval of De-bundled Nanotubes" which is hereby incorporated herein by reference in its entirety for all purposes.

STATEMENT REGARDING FEDERALLY SPONSORED RESEARCH OR DEVELOPMENT

Not applicable.

BACKGROUND

1. Field of the Invention

This invention relates generally to the methods of manipulating nanotubes. More specifically, the invention relates to a method of retrieving and isolating nanotubes dispersed in solution.

2. Background of the Invention

Nanotubes are a novel class of nanostructures that exhibit significant mechanical, electrical, and thermal properties, thus having potential applications such as nanoscale probe devices, energy storage components, sensors, flame retardant materials, conductive ink, and electrical conductors in the aerospace, automotive, micro-electric, photovoltaic, and energy transmission industries. In addition, nanotubes may be constructed of a variety of different materials, including carbon, silicon, metal-oxide and other inorganic compounds. Nanotubes may be classified as multi-walled nanotubes (MWNT) and single walled nanotubes (SWNT). SWNT in particular exhibit remarkable properties, but are difficult to manipulate individually.

Specifically, after synthesis SWNT nanotubes demonstrate an affinity for forming into roped, bundled or entangled configurations. The aggregated nanotube bundles do not yield the theoretically advantageous properties expected by calculations. The technical advantage of dispersing nanotubes for use in organic and inorganic media has implications in creating material with uniform nanotube distribution acting as a structural, mechanical, conductive or thermal component of the material.

Aggregation and bundling of nanotubes represents a constraint for implementation of these structures to maximize their advantageous properties in nanoscale applications. Previous attempts to disperse nanotubes have included covalent and noncovalent functionalization, including long term ultracentrifugation. The covalent functionalization is highly efficient, but results in significantly degraded physical and electrical properties. Ultra-centrifugation may produce intact and individually dispersed nanotubes, but due to the low yields of dispersed nanotubes it is inefficient.

Due to the difficulty in completely dispersing nanotube bundles, the differential control over the location and orientation of the individual nanotubes represent an additional hurdle to commercial applications. As such, the homogeneous incorporation of nanotubes in compositions has been restricted for use in macroscale materials. Methods utilizing high temperatures and lasers for post-deposition alignment have been academically tested but commercial-scale applications have not been realized. Additionally, these methods are impractical for fabricating polymer nanocomposites and microelectronics with nanotubes, as the techniques ablate, damage, or alter the nanotubes or the supporting substrate irreversibly Consequently, there is a need for a physical method suitable for dispersing and retrieving nanotubes from suspensions for the placement, alignment with high precision and order on a substrate or embedded therein.

BRIEF SUMMARY

A method for dispersing nanotubes, comprising forming a nanocomposite solution, having associated nanotubes and nanoplatelets, mixing a surfactant to the nanocomposite solution, separating the nanocomposite in solution, wherein the nanotubes remain suspended in the surfactant solution, and isolating the nanotubes in solution.

In certain instances, the method further comprises functionalizing the nanotubes in solution, isolating the nanotubes from solution and dispersing the nanotubes in a solvent.

The method further comprises forming a nanocomposite by: adding at least one nanotube to a first solution, wherein the first solution oxidizes the nanotube, isolating the nanotube from the first solution and resuspending the nanotube in aqueous solvent to form an oxidized nanotube solution, adding at least one nanoplatelet to a second solution, wherein the second solution exfoliates the nanoplatelet, to form an exfoliated nanoplatelet solution, and mixing the oxidized nanotube solution and exfoliated nanoplatelet solution to form a nanocomposite solution comprising at least one exfoliated or disentangled nanotube associated with the at least one nanoplatelet.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following descriptions and claims to refer to particular system components. This document does not intend to distinguish between components that differ in name but not function.

As used herein, the term "nanotube(s)" or NT(s) refers to any cylindrical atomic allotrope or polyatomic molecule with a diameter of about at least 0.2 nm, a length greater than about 20 nm, an aspect ratio (length to diameter ratio) of at least about 10 and outer walls comprising one or more layers.

As used herein, the term "carbon nanotube(s)" or CNT(S) refers to any cylindrical carbon allotrope, with a diameter of greater than about 0.2 nm, and outer walls comprising one or more graphene layers.

As used herein the term "single walled nanotube(s)" or "SWNT(s)" refers to any nanotube with outer walls comprising one layer. Additionally, the term "multi-walled nanotube(s)" or "MWNT(s)" refers to any nanotube with outer walls comprising at least 2 layers, as used herein. It may be understood that the "SWNT(s)" and "MWNT(s)" of the present disclosure are "single walled carbon nanotube(s)" and "multi-walled carbon nanotube(s)," although the present disclosure is not limited to carbon nanotube(s) applications exclusively.

Also, as used herein, the terms "disperse", "de-rope" or "de-bundle" refer to the substantial separation or disentanglement of individual nanotubes from a bundle, rope, aggregate, clump, intertwined, or similar conformation compromising one or more nanotubes in association with each other.

Additionally, as used herein, the term "exfoliate" relates to the process of removing a layer from a material. "Exfoliated" as used herein refers to a nanostructure that has been stripped to one layer. Alternatively, "exfoliated" as used herein refers to partially dispersed, individually dispersed, or monodisperse nanomaterials, having been stripped in layers from a bundle, rope, or aggregate of similar nanomaterials.

In addition, as used herein, the term "nanocomposite" or "hybrid" refers to a combination of, mixture of, or composite of the materials preceding or proceeding the term but is not limited to only the included materials.

DETAILED DESCRIPTION OF THE PREFERRED EMBODIMENTS

Figure 1:
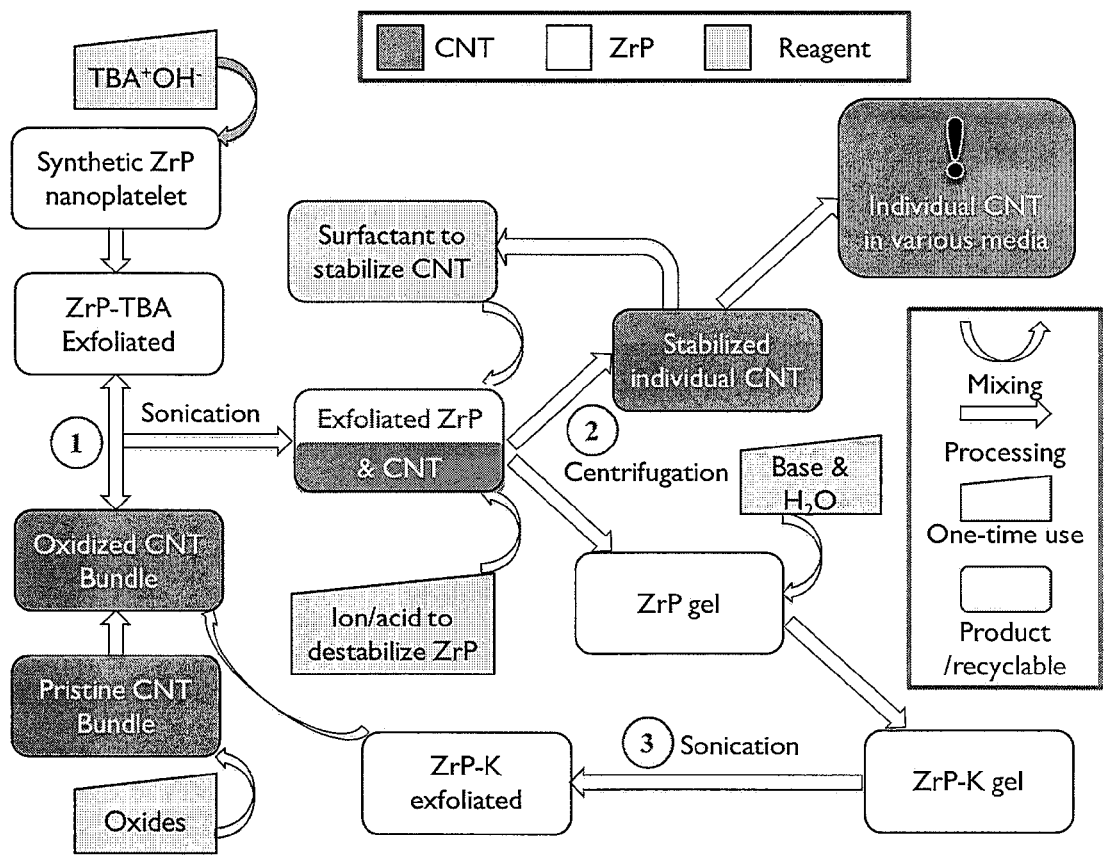
FIG. 1 illustrates a schematic of a method for dispersing and retrieving nanotubes according to one embodiment of the present disclosure.

Overview. FIG. 1 illustrates a schematic according to one embodiment of the disclosure. In instances, the method comprises a nanotube debundling and retrieval process, including pre-treatment of the nanotubes, exfoliation of nanoplatelets, nanoplatelet-assisted dispersion of CNT, retrieval of nanotubes from the nanotube-nanoplatelet mixture using acid/ion solutions and surfactants, and recycling of nanoplatelets to be re-used for additional rounds of nanotube dispersion. While, methods for dispersing and depositing carbon nanotubes by chemical methods have been previously disclosed, for instance in U.S. application Ser. No. 12/112,675 to "Dispersion, Alignment and Deposition of Nanotubes" and U.S. Prov. App. No. 61/150,192 "Preparation of Isolated Nanotubes and Related Polymer Nanocomposites", both of which are hereby incorporated herein by reference in entirety for all purposes, the present disclosure is drawn to alternate methods of isolating nanotubes and retrieving them from a nanocomposite in solution.

Nanotubes. The nanotubes manipulated in this disclosure are any commercially available. The nanotubes employed in embodiments of the disclosed method are of any synthetic classification, as understood by those skilled in the art. The nanotubes are comprised of any materials such as, but not limited to carbon, silicon, metals or inorganic compounds. The nanotubes comprise, without limitation, single walled nanotubes, multi-walled nanotubes or combinations thereof. The nanotubes have a diameter of between about 0.2 nm and about 30 nm, preferably between about 1 nm and about 10 nm. The nanotubes have an aspect ratio, or length to diameter ratio, of at least about 20, preferably the nanotubes aspect ratio is at least about 30, and most preferably the aspect ratio is at least about 1,000.

In instances, the nanotubes are carbon nanotubes. The carbon nanotubes have a diameter of between about 0.2 nm and about 20 nm. The carbon nanotube length is at least about 100 nm. In certain embodiments, the length is at least 1,000 nm. The carbon nanotube aspect ratio is at least 20, in certain embodiments the aspect ratio is at least 1,000. The carbon nanotubes comprise single walled carbon nanotubes (SWNTs) or multi-walled carbon nanotubes (MWNTs). In certain instances, the nanotubes comprise XD-Grade nanotubes or HIPCO® SWNT, such as those available from Carbon Nanotechnologies, INC and UNIDYM™. In certain instances, the SWNTs comprise a mixture of metallic SWNTs and semiconducting SWNTs. Without wishing to be limited by theory, the wrapping directionality of a SWNT graphene lattice determines multiple properties of the nanotube, including without limitation conductivity and semi-conductivity. In instances, nanotubes that have a high conductivity may be considered metallic SWNTs and the nanotubes with a low conductivity may be considered semiconducting SWNTs. As may be understood by a skilled artisan, the nanotubes may be a mixture of conducting and semiconducting nanotubes.

In embodiments, the nanotubes are functionalized nanotubes. Functionalized nanotubes comprise nanotubes that have chemically treated outer walls, such that the outer walls include functional groups. In certain embodiments, functionalized nanotubes comprise oxidized nanotubes. Without limitation by theory, it may be difficult to determine the percentage of oxidized carbons within a nanotube solution. However, it should be noted that the method of the present disclosure is applicable to a wide range of oxidation levels, including minimal oxidation. As such the oxidation of the nanotubes is at least about 1%; alternately, the oxidation is at least about 4%; and in certain instances, the oxidation is at least about 10%. Chemical treatment comprises exposure to a chemically active media, a photo-chemically or an electro-chemically active environment. The chemically active media or environment can be oxyacids, peroxides, oxygen plasma, microwave, voltaic pulse, combinations thereof, or others known to a skilled artisan. In embodiments, one or more nanotubes are admixed into a chemically active media comprising an acid solution to form oxidized nanotubes. The acid solution comprises any acid known to those skilled in the art. Preferably, the acid solution is a strong acid. Further, the acid solution comprises a mixture of strong acids. Non-limiting examples, suitable acids include concentrated sulfuric acid, concentrated nitric acid, and combinations thereof. In certain embodiments, the strong acid solution comprises a concentrated sulfuric acid to concentrated nitric acid in a volume ratio of about 3:1. The nanotubes are oxidized in the strong acid solution by mixing the nanotubes using an ultrasonicator for between about half hour and about five hours, preferably between about two hours and about five hours, and most preferably for about two hours to about three hours. In instances, SWNTs are ultrasonicated for at least about 3 hours in the chemically active media. In alternative instances, MWNTs are ultrasonicated for at least about 2 hours in the chemically active media. The nanotubes are ultrasonicated at about room temperature to reduce or prevent severe oxidation. After sonication in acid, the oxidized nanotube aggregates may be splayed at the ends into negatively charged carboxylic groups. As may be understood by a skilled artisan, the method and duration of the oxidation steps may be dependent on the source, batch, and nanotube defects. In certain instances, the nanotubes comprise enough carboxylic functionality for implementation in the present process.

The oxidized nanotubes are isolated from the acid, for example the nanotubes are isolated by filtration under vacuum. In further instances, the oxidized nanotubes are isolated using a filter or membrane, for instance a PVDF (polyvinylidone fluoride) membrane filter. A non-limiting exemplary filter may be any produced by Millipore™. In certain instances, the oxidized nanotubes are washed during filtration with a mild solution. In instances, a mild solution comprises a neutral solution, a weak or diluted basic solution, or combinations thereof. The diluted basic solution comprises any base, for instance sodium hydroxide, potassium hydroxide, calcium hydroxide, and others known to a skilled artisan without limitation. In instances, a diluted basic solution comprises an aqueous solution, such that the base has a concentration between about 5 mM and about 900 mM; alternatively about 50 mM and about 500 mM. In certain instances, a 100 mM aqueous potassium hydroxide solution is used to filter and wash the oxidized nanotubes.

After filtering and isolating, the nanotubes may be further washed with another acid to restore carboxylic groups. As may be understood by a skilled artisan, washing in a dilute basic solution may at least partially remove or neutralize the oxidized carboxylic groups. Without limitation by theory, washing the nanotubes with an acid prior to re-suspending, restores the oxidized carboxylic groups on the isolated nanotubes. In instances, the acid comprises hydrochloric acid and in alternative instances, sulfuric or nitric acid.

The isolated nanotubes are re-suspended in an aqueous solution. The aqueous solution may be any of those known to one skilled in the art such as, but not limited to, de-ionized water (DI $H_2O$). The weight percent (wt %) concentration of nanotubes in aqueous solution ranges from 0.001% to 5%, more preferably 0.1% to 0.3%, and most preferably from 0.1% to 0.2%. The isolated nanotubes may be resuspended by agitation, shaking, or sonication, without limitation.

Nanoplatelets. Nanoplatelets are nanoparticles having a thin, planar geometry. The nanoplatelets have a diameter range from about 10 nm to about 20,000 nm, and preferably the nanoplatelet diameter is between about 100 nm and 1000 nm. Nanoplatelets have an aspect ratio, defined as the diameter to thickness ratio, of between about 10 to about 20,000; preferably the aspect ratio is between about 100 and about 4,000; and most preferably between about 100 and 500. Additionally, the nanoplatelets may comprise any suitable shape without limitation, such as circular, rectangular, triangular, or combinations thereof. Furthermore, the nanoplatelets may comprise any suitable material, as known to one skilled in the art without limitation, such as graphite, inorganic crystal, organic crystal, montmorillonite clay (nanoclay), or combinations thereof. In certain embodiments nanoplatelets are comprised of an inorganic crystal; such as alpha-zirconium phosphate $Zr(HPO_4)_2 \cdot H_2O$, hereinafter ZrP.

In embodiments, the nanoplatelets are exfoliated. Exfoliated nanoplatelets are nanoplatelets that are or have been chemically separated into individual crystalline layers. Exfoliated nanoplatelets are created in a chemically active media. In instances, the chemically active media comprises a basic-aqueous solution. The aqueous solution may comprise any solution known to those skilled in the art that will exchange protons. Examples of suitable solutions that may be used include alcohol-water, amine bases, hydrocarbon solutions, salt solutions, aqueous base solutions or combinations thereof. In certain instances, the solution is an aqueous tetra-n-butylammonium hydroxide (TBA$^+$OH$^-$) solution. The aqueous solution comprises DI H$_2$O. The molar weight ratio of nanoplatelets to base in aqueous solution ranges from about 1:0.05 to about 1:2, preferably from about 1:0.05 to about 1:1, and more preferably from about 1:0.8 to about 1:1

In instances, exfoliated nanoplatelets have a positive electrostatic charge on the surface of both sides. Without wishing to be limited by theory, the nanoplatelet with a positive electrostatic charge on the surface of both sides may be considered a deprotonated, exfoliated nanoplatelet. Without being limited by theory, in the exfoliated nanoplatelet solution, a base covers the surface of the platelets and forms highly charged ion pairs. In instances, the positive ions are bulky with a diameter of about 1 nm, which is much larger than the inter-platelet spacing. The positive charge comes from ions within the base. When paired with the P—O$^-$ ions on the surface of the platelets, the positive ion does not come close to the negative charge due to the hindrance of the butyl chains, thus allowing the plate-like surface to exhibit strong positive charge. The reaction time and/or concentrations of reactants may be varied to obtain ZrP with the designed range of aspect ratios.

In further embodiments, the exfoliated nanoplatelets may be re-aggregated and re-dispersed a plurality of times. In instances, the nanoplatelets are re-protonated to re-aggregate in solution. In certain instances, the exfoliated nanoplatelets are re-protonated by an acid solution, or an acidic-aqueous solution. Without limitation by theory, the conjugation of freshly synthesized nanoplatelet Zr(HPO$_4$)$_2$.H$_2$O with a base (e.g., TBA$^+$OH$^-$) is a reversible acid-base reaction because of the weak acidity of the HPO$_4^{2-}$ (pKa=12.3). Therefore, the addition of a strong acid (e.g., HCl (pKa≈−6) is likely to break the conjugation and causes the detachment of TBA$^+$ from the surface of the nanoplatelets. Consequently, the surface of nanoplatelets is neutralized. In instances, the neutralized nanoplatelet tends to loosely re-aggregate in solution. As above, without limitation by theory, the neutralized nanoplatelets may have a similar charge state as newly synthesized, un-exfoliated nanoplatelets. However, the neutralized nanoplatelets may not form a close-packed structure as found in new nanoplatelets. In further instances, maintaining the neutralized nanoplatelets in solution or another wet state that permits repeated de-protonation and re-dispersion. Thus, the nanoplatelets are indefinitely recyclable between a dispersed exfoliated state and an aggregated state.

In certain instances, the exfoliated nanoplatelets are reaggregated by another ionic solution. Without limitation by theory, the ionic solution screens out the positive charge on the surface of the exfoliated nanotubes, such that they are destabilized. In instances, the destabilized nanoplatelet tends to loosely re-aggregate in solution. In further instances, maintaining the destabilized nanoplatelets in solution or another wet state permits de-protonation (if needed), and re-dispersion. Thus, the nanoplatelets are indefinitely recyclable between a dispersed exfoliated state and an aggregated state.

Exfoliated Nanotubes. In embodiments, in order to exfoliate and disperse the oxidized nanotubes, the aqueous-oxidized nanotube solution and aqueous-exfoliated nanoplatelet solution are admixed. In instances, the weight ratio of nanotubes to nanoplatelets is between about 1:1 to about 1:5. As may be understood by one skilled in the art, the weight ratio may change depending on the type, length, diameter, and defect level of the nanotubes. Alternatively, the weight ratio may change dependent on the desired exfoliation efficiency, the end product, the intended applications, and the processes of exfoliation. In instances, the combined nanotube/nanoplatelet solution is mechanically agitated for a period of time ranging from about 10 minutes to about 60 minutes. Examples of mechanical agitation methods that may be used include without limitation shaking, stirring, sonication or other mechanical means. In certain instances, the nanotube/nanoplatelet solution is stirred. After initial mechanical agitation, the mixture is homogenized, for example by ultrasonication. The temperature during homogenization is from about 4° C. to about 80° C., preferably from about 20° C. to about 40° C., and most preferably from about 20° C. to about 30° C. In certain instances, the solution is ultrasonicated at approximately room temperature for homogenization. In instances, the solution is ultrasonicated for about 0.5 hour to about 12 hours, preferably from about 1 hour to about 12 hours, and most preferably 1 hour to about 8 hours. In certain conditions, the time and temperature are dependent on sonicator power and bath efficiency. In alternate conditions, the source, batch, and carboxylic functionalities may dictate the sonicator bath, time temperature, and power. After ultra-sonication the aqueous nanotube/nanoplatelet solution is a homogenous solution of dispersed nanotubes and associated nanoplatelets.

The exfoliation and dispersion of nanotubes is attributed to the presence of the nanoplatelets. Without being limited by theory, the negatively charged surface of nanotubes attracts the positively charged surface of the nanoplatelets. By mixing the positively charged nanoplatelets with negatively-charged bundled nanotubes, the nanoplatelets are attached onto the nanotube side walls and forcing nanotube bundles into individual tubes during ultra-sonication. In instances, the nanoplatelets are electrostatically tethered to the nanotubes during and after sonication. After the dispersion of the nanotubes, the individual tubes have at least one nanoplatelet attached on their surfaces. The nanoplatelets cannot be re-stacked together to form regular layered structures due to the presence of nanotubes. In certain instances, it can be envisioned a plurality of nanoplatelets are electrostatically tethered to the nanotubes. Thus each nanoparticle interferes with the re-aggregation of the other by a steric or physical hindrance effect. The hindering effect comes from the two-dimensional heterogeneous shapes of the nanoplatelets interfering with other nanoplatelets associated with nearby nanotubes. The surface charge and two-dimensional nature of exfoliated nanoplatelets disperse the nanotubes and hinder the re-aggregation thereof. The nanotubes dispersed by the nanoplatelets are exfoliated. The nanotubes and nanoplatelets are electrostatically associated. The nanotubes associated with the nanoplatelets comprise a nanocomposite.

A surfactant is added to the nanocomposite solution to stabilize the exfoliated nanotubes. Adding the surfactant forms a nanocomposite-surfactant solution. The surfactant is added until the nanotubes reach a concentration of at least about 5 ppm; alternatively, the surfactant is added until the nanotubes reach a concentration of at least about 80 ppm; and in certain instance the surfactant is added until the nanotubes of a concentration of about 240 ppm. Surfactants may be anionic surfactants, cationic surfactants, non-ionic surfactants, zwitterionic surfactants, and combinations thereof, without limitation. Examples of suitable surfactants include polyvinylpyrrolidone (PVP), sodium dodecyl sulfate (SDS), and hydrophilic polyethylene oxides (TRITON™ X-100). The surfactant may be any known to one skilled in the art for suspending oxidized and exfoliated nanotubes. The surfactant is added until the surfactant concentration is between about 0.1 wt % and about 10 wt % and in certain instances the surfactant concentration is kept at about 1.0 wt %. Further, the nanocomposite-surfactant solution is mechanically agitated, and in certain instances, stirred for at least about 5 minutes. Alternatively, the nanocomposite-surfactant solution is stirred for at least about 30 minutes and in further instances for about 60 minutes. As understood by one skilled in the art, the final, combined volume of aqueous surfactant and exfoliated-nanotube solution may vary with the original nanotube mass, the final concentration, or dispersion needed for a pre-determined application. In alternative instances, volume of aqueous surfactant and exfoliated-nanotube solution may be altered for scaled up or commercial purposes. Additionally, the method and period of time for mechanically agitating the nanocomposite-surfactant solution may be adjusted.

Nanotube Dispersion and Retrieval. The nanocomposite is separated and the exfoliated nanotubes are retrieved as dispersed nanotubes. The nanocomposite, comprising the nanotubes and associated nanoplatelets is separated by altering the ionic balance or pH of the nanocomposite-surfactant solution. In instances, after adding surfactants, an aqueous acid solution is added to the nanocomposite-surfactant solution. Without limitation by theory, the addition of an acid disrupts the electrostatic tethering of the nanocomposite and causes the re-aggregation of nanoplatelets. The surfactant in the solution stabilizes the dispersed nanotubes and resists nanotube agglomeration, bundling, roping, or other forms of re-aggregation, without limitation. Further, the nanoplatelets are retrieved as aggregates and recycled for additional nanotube dispersions.

In embodiments, the aqueous acid comprises any known to one skilled in the art. In instances the aqueous acid comprises hydrochloric acid, acetic acid, sulfuric acid, or phosphoric acid. In certain instances, the aqueous acid comprises hydrochloric acid. The aqueous acid solution has a concentration of between about 0.1 mM and about 900 mM; alternatively, between about 50 mM and about 250 mM; and in certain instances, the concentration is about 100 mM. Further, after the acid is added to the nanocomposite-surfactant solution the concentration of hydrogen ions in the nanocomposite-surfactant solution is between about 0.01 mM and about 5 mM; alternatively, between about 0.5 mM and about 2.5 mM; and in certain instances, between about 0.75 mM and about 1.5 mM. As may be understood by one skilled in the art, the concentration of the aqueous acid and the hydrogen ions may be altered with the concentration of nanocomposites, the concentration of surfactants, the surfactant used, the original nanotube mass, the final concentration, the dispersion needed for a pre-determined application, or combinations thereof. In alternative instances, the concentration of the aqueous acid and the hydrogen ions may be altered for scaled up or commercial purposes.

In embodiments, the aqueous acid is added to the nanocomposite-surfactant solution. In instances, the acid is added to the nanocomposite-surfactant solution incrementally. The acid may be added to the nanocomposite-surfactant solution in any incremental method known to an artisan, without limitation. For instance, drop-wise, trickling, seeping, or any other method to add the acid in a slow flow rate, or small volume is acceptable. Additionally, the nanocomposite-surfactant solution may be mechanically agitated, such as described herein previously, to increase the rate of nanocomposite dissociation. In certain instances, the nanocomposite-surfactant solution is stirred.

In instances, the addition of the aqueous acid and the stirring induces the nanocomposite dissociation. The nanotubes separate from the nanoplatelets and remain stabilized in solution. In instances, the nanoplatelets re-aggregate and partially precipitate. In certain instances, the re-aggregation of nanoplatelets forms higher molecular weight nanoplatelet nanoparticles. The separation of nanotubes and nanoplatelets forms a dissociated nanoparticle solution.

Alternatively, the nanocomposite is separated and the exfoliated nanotubes are retrieved as dispersed nanotubes by adding a salt or salt solution. The nanocomposite, comprising the nanotubes and associated nanoplatelets is separated by altering the ionic balance of the nanocomposite-surfactant solution by adding a salt. In instances, after adding surfactants, an aqueous salt solution is added to the nanocomposite-surfactant solution. Without limitation by theory, the addition of a salt disrupts the electrostatic tethering of the nanocomposite. In instances, the surfactant in the solution stabilizes the dispersed nanotubes and resists agglomeration, bundling, or roping of the nanotubes, without limitation.

The aqueous salt comprises any known to one skilled in the art, such as, without limitation, sodium chloride, potassium chloride, magnesium chloride, aluminum chloride, sodium hydroxide, or sodium acetate. In certain instances, the aqueous salt comprises potassium chloride. The aqueous salt solution has a concentration of between about 1 mM and about 500 mM; alternatively, between about 10 mM and about 250 mM; and in certain instances, the concentration is about 100 mM. Further, after the aqueous salt is added, the ion concentration in the nanocomposite-surfactant solution is between about 0.01 mM and about 80 mM; alternatively, between about 0.1 mM and about 35 mM; and in certain instances (e.g., monovalent salt) between about 21 mM and about 26 mM. As may be understood by one skilled in the art, the concentration of the aqueous salt ions may be altered with the types of salts, concentration of nanocomposites, the concentration of surfactants, the surfactant used, the original nanotube mass, the final concentration or dispersion needed for a pre-determined application, or alternatively, for scaled up and/or commercial purposes.

In instances, the aqueous salt is added to the nanocomposite-surfactant solution incrementally. The salt may be added to the nanocomposite-surfactant solution in any incremental method known to an artisan, without limitation. For instance, drop-wise, trickling, seeping, or any other method to add the salt in a slow flow rate, or small volume manner is acceptable. Additionally, the nanocomposite-surfactant solution may be mechanically agitated, such described herein previously, to increase the rate of nanocomposite dissociation.

In instances, the addition of the aqueous salt and the stirring induces the nanocomposite dissociation. The nanotubes separate from the nanoplatelets and the nanotubes remain stabilized in solution. In instances, the nanoplatelets re-aggregate and at least partially precipitate. In certain instances, the re-aggregation of nanoplatelets forms higher molecular weight nanoplatelet nanoparticles. The separation of nanotubes and nanoplatelets forms a dissociated nanoparticle solution.

In embodiments, the dissociated nanoparticle solution is separated to form a dispersed nanotube solution. The dissociated nanoparticle solution is separated by settling, filtering, centrifugation, or other processes without limitation. In instances, the dissociated nanoparticle solution is settled. In alternate instances, the dissociated nanoparticle solution is centrifuged. The nanoplatelets, and a portion of trapped nanotubes, are pelleted from solution by centrifugation. In certain instances, the centrifuge is operated to produce a relative centrifugal force (RCF) of at least about 5,000 G. Alternatively, the centrifuge maintains RCF of between about 10,000

G and about 20,000 G. Further, the dissociated nanoparticle solution is centrifuged for between about 1 minute and about 20 minutes. In certain instances, the dissociated solution is centrifuged at about 16,800 G for about 10 min. As understood by one skilled in the art, the centrifuging step may be conducted for an alternate period and rotational frequency in order to obtain RCF suitable for pelleting the nanoplatelets and trapped nanotubes. In certain instances, the diameter of the rotor and rotational frequency may dictate the relative centrifugal force applied to the surfactant and the period of time required for removing the re-aggregated nanoplatelets from the dispersed nanotube solution.

In embodiments, the supernatant is retrieved to form the dispersed nanotube solution. In instances, supernatant may be retrieved by decanting, sipping or other methods known to a skilled artisan. In certain instances, the supernatant comprises the dispersed nanotube solution and may be readily used for certain applications. Furthermore, after exfoliation, dissociation, and separation, the nanotubes dispersed in the supernatant solution may be destabilized and separated from surfactants by filtration and/or centrifugation; additional solvent during filtration or repeated centrifugation and re-suspension may be needed to remove impurity. Without limitation by theory, the surfactant may determine the solvent used to destabilize the nanotubes. Depending on the type of surfactant used to dissociate the nanocomposite, organic solvents (e.g., acetone), or salt-organic solvent combinations are used to destabilize the nanotubes. In non-limiting examples, acetone may be used if SDS/acid have been used to separate nanotubes from the nanoplatelets, or acetone and salt maybe used together if Triton/ion have been used to separate nanotubes from the nanoplatelets. Alternatively, the destabilized nanotubes may be maintained in solution or a wet state for redispersion into various solutions and solvents of different compositions or dried for applications in different matrices or substrates.

In certain embodiments, the dispersed nanotubes may be functionalized, or re-functionalized, after separation from the nanoplatelets. In instances, a functionalizing substance or solution is added to the dispersed nanotube solution. The functionalizing solution comprises any solution or reactant that may render the nanotubes insoluble in water. The functionalizing solution comprises any compound that will react with the nanotubes to add amine groups, amide groups, ions or other organic and inorganic groups without limitation. In certain instances, a solution of sulfanilamide is added to the dispersed nanotube dispersion. Additionally, a solvent that is miscible in water may be used to increase the rate of functionalization. In instances, acetone with a concentration of between about 5% and about 20%, and in certain instance the acetone concentration is about 10%. The concentration of sulfanilamide is sufficient to form a 1:1 stoichiometry of the amine groups on sulfanilamide and carboxylic groups of the nanotubes to form a functionalized nanotube solution. Without limitation by theory, the desired functionalization stoichiometry of the nanotubes may be controlled by the concentration of the functionalizing solution. The functionalizing solution and dispersed nanotube solution mixture is kept at a temperature from about 40° C. to about 200° C.; from about 60° C. to about 100° C., and in certain instances at about 70° C. Alternatively, the functionalizing solution and dispersed nanotube solution mixture is kept at about room temperature. In another instance, in order to control functionalization, the time that the mixture is kept at may be altered. In certain instances, to achieve a functionalized nanotube solution, the functionalizing solution and dispersed nanotube solution mixture is allowed to react for at least 30 minutes; alternatively, for at least 240 minutes; and in certain instances, the mixture is allowed to react overnight. In further instances, the mixture is allowed to react until the nanotubes form a flocculation. Without limitation by theory, the formation of a nanotube flocculation indicates the surface functionalization of the nanotubes by sulfanilamide, rendering the nanotubes insoluble in an aqueous solution and indicates the formation of functionalized nanotubes.

Retrieval and re-suspension of the nanotubes from the functionalized nanotube solution may be done by any method previously discussed herein, such as by drying, filtration, or centrifugation. After retrieval the functionalized nanotubes may be washed to remove residues of surfactant and chemicals. In instances, the functionalized nanotubes are washed with alcohol, acetone, toluene, or other organic solvents without limitation. As a non-limiting example, the sulfanilamide-functionalized nanotubes are washed with water or alcohol at least once to remove surfactant residues. The washed nanotubes are resuspended with sonication in an organic solvent, such as acetone. In instances, the functionalized and resuspended nanotubes comprise a concentration of at least about 1 ppm; further a concentration of at least about 200 ppm; alternatively a concentration of at least about 600 ppm. As may be understood by one skilled in the art, the step of washing the nanotubes may be excluded for certain applications or end products. The step of washing the nanotubes may be altered depending on the purity requirements of the application or end products.

Nanotubes after destabilization or functionalization may be in an aggregation or flocculation form. But, they do not reform a tightly bound nanotube-bundle structure as the pristine nanotubes so long as they are kept in solution or in a wet state. The individual exfoliation state of nanotubes may be easily re-established by re-suspending the flocculated nanotubes in solution under ultra-sonication.

Nanoplatelet Recycling and Applications: In embodiments, the re-aggregated nanoplatelets may be recycled to form further nanocomposite solutions. Without limitation by theory, the nanoplatelets may be recycled accordingly for an indefinite number of cycles, such that the same mass, volume, or other quantity of nanoplatelets may be used to create multiple batches of exfoliated and dispersed nanotubes. In instances, the re-aggregated nanoplatelets are re-dispersed or re-exfoliated in a chemically active media to form de-protonated, exfoliated nanoplatelets for re-suspension in an aqueous solution as described herein previously. In certain instances, a portion of the re-aggregated nanoplatelets may be associated with nanotubes. Without limitation, the chemically active media may be any described previously, including the media used in the primary exfoliation of nanoplatelets. Alternatively, the chemically active media may comprise an aqueous solution of small or low molecular weight bases. Without limitation by theory, bases with relatively small sizes (e.g., KOH, NaOH, etc) are applicable since the re-aggregated nanoplatelets are not as closely-packed as newly synthesized nanoplatelets. The re-exfoliated, aqueous nanoplatelet solution may be used to form further exfoliated nanotubes by the pathway described herein previously.

The re-aggregated nanoplatelets, whether associating with nanotubes or not, may be re-exfoliated in an appropriate media without using additional active chemicals. The loosely-aggregated nanoplatelets may be exfoliated in a polarity-matched media. In instance that the re-aggregation of nanoplatelets is induced by ions, the nanoplatelets may be directly redispersed in DI $H_2O$ or other solvents with similar polarity depending on how much TBA is stripped off from the surface of the nanoplatelets. In instances that a large amount of acid is used to strip off a significant fraction of TBA from the surface of the nanoplatelets during the re-aggregation of nanoplatelets or afterwards, the re-aggregated nanoplatelets can be considered as neutralized (i.e., not charged) and may be redispersed in a mixture of de-ionized water and ethanol with a volume ratio of between about 1:5 and about 5:1; alternatively between about 1:1 and about 5:1; and further a volume ratio of water to ethanol of about 3:1. The composition of the media may be varied by those skilled in the art but the principle of dispersing the nanoplatelets without de-protonating is to match the polarity (e.g., by matching the dielectric constant) of the solvent to that of the nanoplatelet. In certain instances, the re-exfoliation is carried out under ultrasonication. The preferable sonication time is at least 1 hr and may vary depending on the concentration of nanoplatelets and the power of the sonicator. The neutralized nanoplatelet stabilized solely by solvent shows different stability to the positively charged nanoplatelets (e.g., nanoplatelets associated with $TBA^+$) stabilized by electrostatic repulsion. While the neutralized nanoplatelet, if undisturbed, can be stabilized in a polarity-matched solvent for several months without precipitation, they can be easily re-aggregated by centrifugation. On the other hand, the charged nanoplatelets remain stable during centrifugation.

In further instances, the neutralized nanoplatelets with the TBA groups on the surface almost completely stripped off by a sufficient amount of acid, may be used for sorting nanotubes. To maximize the sorting efficiency, the neutralized nanoplatelets may be redispersed and re-exfoliated in a mixture of DI $H_2O$ and ethanol. It is found that neutralized nanoplatelets have better affinity to certain species of SWNTs. When mixing with oxidized HiPco SWNT solution, the neutralized re-exfoliated nanoplatelets preferentially associate with conducting or metallic SWNT bundles.

In further embodiments, the nanotubes may be sorted after nanoplatelet-assisted exfoliation. After the nanotubes are exfoliated by deprotonated, exfoliated nanoplatelets via electrostatic tethering, the nanotubes and nanoplatelets in the nanocomposite solution may be co-precipitated by an acid, salt, an acidic or an ionic solution, as described herein previously. No surfactant is needed beforehand to stabilize nanotubes. In instances, the co-precipitated nanotubes and nanoplatelets partition from the solvent to form a gel, for example by settling or centrifugation without limitation, also as described previously. The gel comprises the exfoliated nanotubes and nanoplatelets, and in certain instances a portion of the aqueous solution described herein previously. In embodiments, the gel is immersed in an acidic solution for the nanoplatelets inside to be neutralized (i.e., stripping off $TBA^+$). Extra acid is then removed by centrifugation and suspension. The nanotube-nanoplatelet gel may be redispersed in a solution, for example an aqueous solution or a solvent-aqueous solution. In instances, the solution comprises DI $H_2O$ and ethanol. In certain instances, the solution comprises a volume ratio of water to alcohol of between about 1:5 and about 5:1; alternatively between about 1:1 and about 5:1; and further a volume ratio of water to ethanol of about 3:1. In embodiments, the re-suspended gel solution comprises re-exfoliated nanoplatelets and nanotubes.

In embodiments, re-exfoliated nanoplatelets differentially associate with nanotubes having different chiralities. More specifically, the re-exfoliated nanoplatelets preferentially associate with conducting or metallic SWNTs. In instances, re-exfoliated nanoplatelets associated with metallic SWNTs forms a metallic nanocomposite. The metallic nanocomposite may be separated from the semiconducting SWNTs by settling or expedited by centrifugation. In certain instances, the centrifuge is operated after surfactants (e.g., Triton) are added and the mixture is sonicated for surfactants to stabilize semiconducting SWNT. The centrifuge is operated to produce a relative centrifugal force (RCF) of at least about 5,000 G. Alternatively, the centrifuge maintains RCF of between about 10,000 G and about 20,000 G. Further, the dissociated nanoparticle solution is centrifuged for between about 1 minute and about 120 minutes; alternatively, between about 30 minutes and about 90 minutes. In certain instances, the dissociated solution is centrifuged at about 16,800 G for about 60 min. Without limitation by theory the supernatant substantially comprises the semiconducting SWNTs and the pellet substantially comprises the metallic SWNTs. The semiconducting SWNTs may be retrieved from the supernatant and the metallic SWNTs may be resuspended, dissociated from the exfoliated nanoplatelets, and functionalized by any of the applicable processes described herein.

The recyclable nanoplatelets are additionally, suitable for application in composites, metals, liquids, or other applications known to a skilled artisan. Further, the recycling of the nanoplatelets through multiple nanotube dispersion represents a cost reduction for the industrial scale application of the disclosed process. The materials and steps needed for the synthesis and primary or first exfoliation of the nanoplatelets may be reduced in frequency and quantity. Small size and molecular weight bases can be used to exfoliate the re-aggregated nanoplatelets as a cost reduction. In certain applications, the recyclable nanoplatelets may be stored in solution for indefinite periods for use in future nanotube dispersions, thereby reducing the cost of re-starting exfoliated nanotube production in the event of a stoppage or production shutdown.

Dispersed Nanotube Applications: The resuspended, isolated nanotubes, whether functionalized or not, are suitable for applications in composites, metals, liquids, or other applications known to a skilled artisan. In non-limiting examples, the isolated nanotubes may be incorporated in a matrix such as liquids, oils, inks, polymers, epoxies, resins, waxes, alloys, nanoclays, or combinations thereof. Without limitation by theory, the dispersed, exfoliated, and/or functionalized nanotubes may be directly mixed into any matrix or suspension. In a non-limiting example, the exfoliated nanotubes are mixed in a suspension of a nanoclay.

In certain applications, the isolated nanotubes may be deposited on a surface or substrate from the resuspended, isolated nanotube solution. In embodiments, the dispersed nanotubes may be used as an ink to form a thin film. In instances, an aqueous dispersion of nanotubes may be deposited on a substrate. In certain instances, the nanotubes are deposited on a substrate as an ink. In alternate instances, the nanotubes are deposited on the substrate as a coating. Further, the nanotubes may be deposited on the substrate during heating, under vacuum, during deposition of other materials, or combinations thereof. In embodiments, the solution is removed from the nanotubes deposited on the substrate. In certain instances, the solution may be removed by evaporation, vacuum, heating, or combinations thereof. Without limitation by theory, the dried nanotubes may comprise a thin film.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent ... 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

To further illustrate various illustrative embodiments of the present invention, the following examples are provided:

EXAMPLES

Overview: FIG. 1 gives an overview illustration of the CNT debundling and retrieval process, including pre-treatment of CNT, exfoliation of nanoplatelets using tetra-butyl ammonium hydroxide (TBA$^+$OH$^-$), nanoplatelet-assisted dispersion of CNT (step 1), retrieval of CNT from the CNT-nanoplatelet mixture using acid/ion and surfactants (step 2), and recycling of nanoplatelets to be re-used for CNT dispersion again (step 3).

Preparation of Alpha-zirconium Phosphate Nanoplatelets (ZrP) and CNTs and Dispersion of CNTs using Exfoliated Nanoplatelets.

Synthesis of ZrP nanoplatelets and pre-treatment of CNTs: The diameter of the ZrP nanoplatelets is around 100 nm. ZrP nanoplatelets were de-protonated and fully exfoliated by tetrabutyl ammonium hydroxide (TBA$^+$OH$^-$) in water with a molar ratio of ZrP:TBA=1:1.

Purified HiPco SWNTs and XD-CNTs were obtained from Carbon Nanotechnologies, Inc. TBA$^+$OH$^-$ and MWNTs were purchased from Sigma-Aldrich. CNTs were first oxidized in a mixture of concentrated sulfuric acid and concentrated nitric acid with a volume ratio of 3:1 by ultra-sonication in a sonication bath (BRANSONIC® 2510) at room temperature for 3 hours for SWNTs and XD-CNTs and for 2 hours for MWNTs, respectively. Then, de-ionized water (DI-H$_2$O) was added to dilute the acids and the mixture was sonicated for another 1 hour. After the above steps, the oxidized CNTs were isolated by using a PVDF filter membrane (MILLIPORE™, 0.45 μm pore size) under vacuum. The CNTs were washed several times with de-ionized water alone during filtration or repeated use of 100 mM KOH aqueous solution and DI-H$_2$O during filtration to further remove the intercalated acid residue. The carboxylic groups on CNTs can be recovered later with HCl if needed. The CNTs collected were then re-dispersed in water by sonication.

Dispersion of pre-treated CNTs with exfoliated nanoplatelets: Two aqueous solutions containing oxidized CNTs and fully exfoliated ZrP nanoplatelets were directly mixed. The weight ratio of CNTs to ZrP nanoplatelets is 1:5. The finial concentrations of CNTs and ZrP in the CNTs/ZrP solution are 100, and 500 ppm, respectively. The mixture was sonicated in a sonication bath at room temperature for 30 min.

It is noted that both the HiPco grade SWNTs and XD grade SWNTs are treated the same and designated as SWNTs in this research because of the similarity in their surface functionalization, and their behavior in subsequent exfoliation, nanoplatelets removal, and redispersion processes.

Separation of Nanoplatelets from Exfoliated CNTs.

Figure 2:
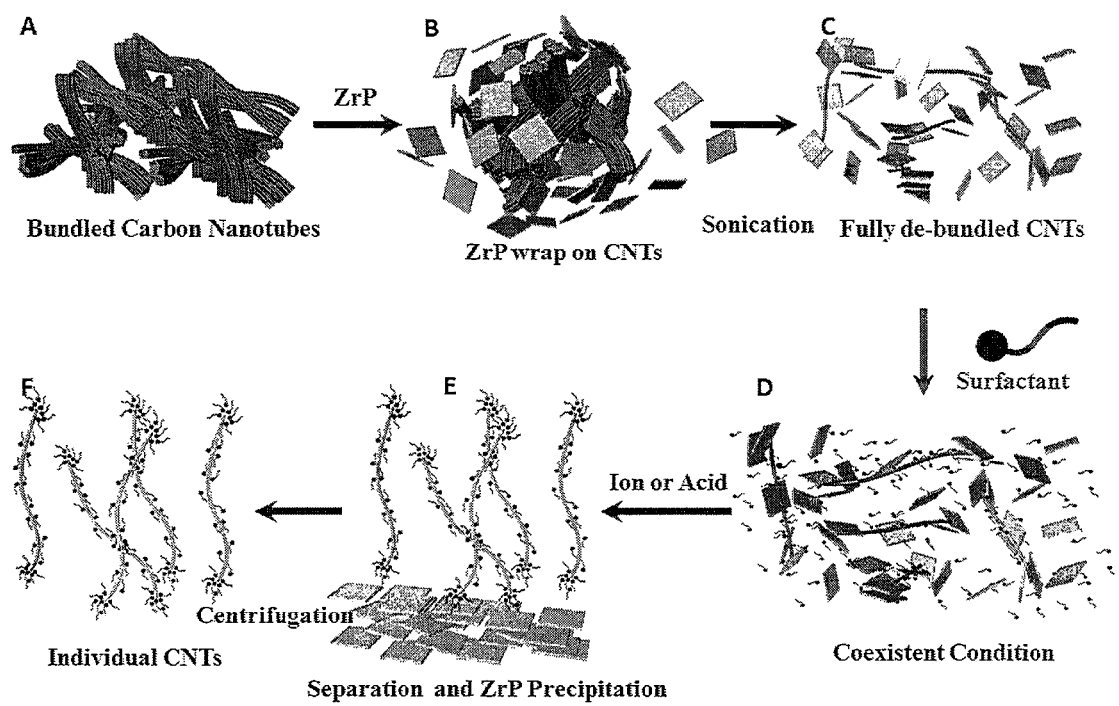
FIG. 2 illustrates a schematic of proposed mechanisms for separating ZrP nanoplatelets from exfoliated nanotubes according to one embodiment of the present disclosure, where (A) is large aggregate of pre-treated nanotubes in aqueous medium, (B) positively charged nanoplatelets are added and electrostatically bound to the negatively charged nanotube aggregates, (C) shows nanotubes are tethered into small bundles and then into individual tubes by nanoplatelets under sonication, (D) the nonionic or ionic surfactants are added to stabilize nanotubes, (E) the ZrP nanoplatelets are precipitated by carefully adjusting the ionic strength or the pH value of the system while the surfactants stabilize nanotubes in the solution, and (F) shows nanotubes remain individually dispersed in aqueous medium, stabilized by surfactants and free of ZrP nanoplatelets.

Use of surfactants for stabilizing CNTs after ZrP-assisted exfoliation in solution: A schematic illustration of the process of ZrP-assisted exfoliation of CNTs and ZrP separation is shown in FIG. 2. Positively charged ZrP nanoplatelets that contain TBA bind to negatively charges CNTs through electrostatic binding and localize sonication energy from the nanoplatelets onto the surfaces of CNTs, resulting in individually dispersed CNTs (FIG. 2A-C). After dispersion, ionic and nonionic surfactants such as sodium dodecyl sulfate (SDS), polyvinylpyrrolidone (PVP), and TRITON™ X-100 (Triton), were added to reach a surfactant concentration of 1.0 wt. % and a CNTs concentration of 80 ppm in a solution with a final total volume of 10 ml. The solution was then stirred for 1 hour (FIG. 2D).

Use of acid for separation of CNTs and nanoplatelets: After adding SDS or Triton surfactants, aqueous solution of HCl with a concentration of 100 mM was added dropwise into the CNTs/ZrP/surfactants mixture during stirring to introduce agglomeration of the detached nanoplatelets through pH tuning. The CNTs remained stable in the solution due to the presence of anionic or nonionic surfactant (FIG. 2E). The concentration of [H$^+$] introduced in CNTs/ZrP/SDS solution was 0.75 mM and 1.5 mM in CNTs/ZrP/Triton solution, respectively. The solutions were then centrifuged at 16,800 G (THERMO IEC CL31) for 10 min. ZrP nanoplatelets together with a certain amount of trapped CNTs were precipitated at the bottom of the centrifugation tubes while most of the surfactant stabilized CNTs were left behind in the supernatant (FIG. 2F). Afterwards, 1 ml of supernatant was diluted for 10 times for yield determination, or the percentage of CNTs maintained in the supernatant after ZrP separation.

Use of salts for separation of CNTs and nanoplatelets: After adding Triton surfactants, aqueous solution of KCl salt with a concentration of 100 mM was added dropwise into the CNTs/ZrP/surfactants mixture during stirring to introduce agglomeration of the nanoplatelets. The ion concentration in SWNTs/ZrP and MWNTs/ZrP solutions are kept at 21 and 26 mM, respectively. The solutions were then centrifuged at 16,800 G for 10 min. ZrP nanoplatelets together with a certain amount of CNTs were precipitated at the bottom of the centrifugation tubes while most of the Triton-treated CNTs were left behind in the supernatant (FIG. 2F). Afterwards, 1 ml supernatant was diluted for 10 times for yield determination.

Table 1 lists the experimental conditions, the results of separation efficiency, and yields for the various methods described above. The separation efficiency is determined by the amount of nanoplatelets removed from the CNT-nanoplatelet mixture.

TABLE 1

Conditions, Yields, and Separation Efficiency.

| Method | Surfactants removal | [H$^+$] or [KCl] (mM) | 1$^{st}$ cycle yield | Separation efficiency |
|---|---|---|---|---|
| Ionic screening (SW) | NA | 10 | NA | Up to 85% |
| Ionic screening plus HCl/SDS (SW) | Acetone | both | >90% | 100% |
| HCl/SDS (SW) | | 0.75 | 75% | 100% |
| HCl/SDS (MW) | | 0.75 | 69% | 100% |
| HCl/Triton (SW) | Acetone & [KCl] | 1.5 | 63% | 100% |
| HCl/Triton (MW) | | 1.5 | 63% | 100% |
| KCl/Triton (SW) | | 21 | 61% | 98.6% |
| KCl/Triton (MW) | | 26 | 61% | 99.5% |

Evaluation of separation efficiency: Energy Dispersive X-ray Spectroscopy (EDS) analysis was used to evaluate the separation efficiency. To obtain surfactant-free CNTs from the surfactant-stabilized dispersions, CNTs stabilized by SDS were destabilized with acetone at 1:1 volume ratio of CNTs/SDS solution to acetone. For CNTs stabilized by Triton, acetone and KCl solution of a concentration of 100 mM were used together to precipitate CNTs. The volume ratio of CNTs/Triton solution, acetone, and KCl solution was kept at 2:2:1. After precipitation, CNTs were collected by centrifugation at 16,800 G for 10 min and then washed with ethanol or methanol for three times by repeated dispersion and centrifugation processes. CNTs were transferred on an aluminum stub and dried at 70° C. for SEM observation.

The content of ZrP nanoplatelets and C element in TBA were calculated based on EDS intensity of P element and the 1:1 stoichiometry of ZrP:TBA. The content of C element in CNTs was calculated from the total content of C element minus that of TBA.

Figure 3:
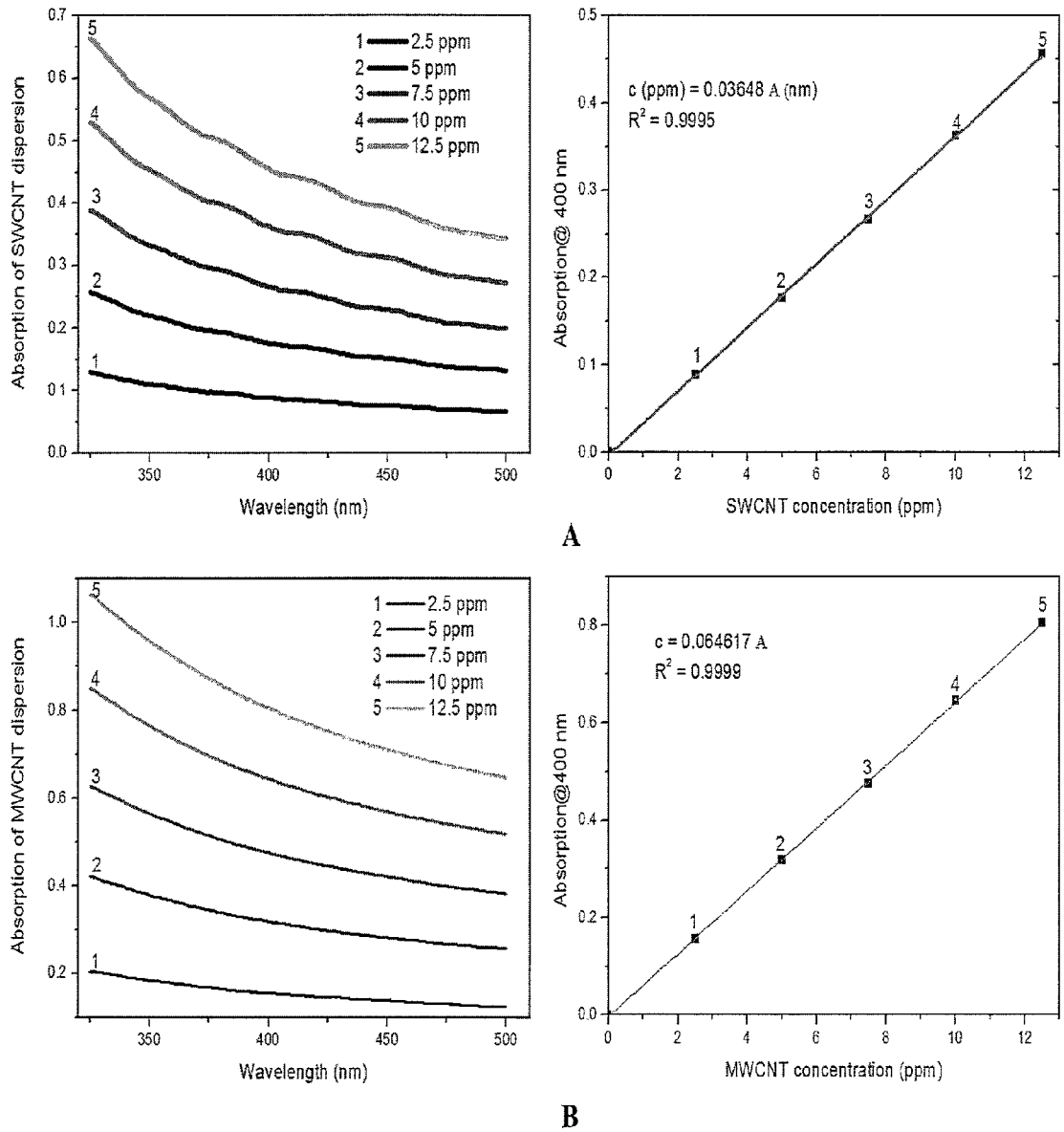
FIG. 3 illustrates UV absorption spectra of the dispersion of (A) SWNTs and (B) MWNTs at different concentrations with the corresponding calibrated curves for concentration and absorption intensity.

Evaluation of yields: Yields were determined by absorption spectra. Standard solutions of CNTs exfoliated by nanoplatelets were prepared with systematically increased CNT concentration from 2.5 to 12.5 ppm. According to Beer-Lambert law, A=dc (A: absorption intensity; ε: constant; l: light path length; c: solutes concentration); the absorption intensity is linearly dependent on the concentration of solutes. By comparing the absorption intensity of the diluted CNTs dispersion mentioned previously and that of the standard solution at 400 nm, where the light is transparent to the surfactants used, the yields of CNTs retrieved from nanoplatelets separation in the solution can be determined accurately. FIG. 3 shows the UV absorption spectra of dispersion of (A) HiPco SWNTs and (B) MWNTs at different concentrations. The standardized linear fitting curves showing the linear relationship between CNT concentration and absorption intensity is also given.

Transfer of Stabilized Individual SWNTs into other Systems of Interest

General process of transfer and stabilization of individual SWNTs: After exfoliation and ZrP removal, isolated SWNTs were separated from surfactants by the same method as the preparation of the EDS sample mentioned above. Instead of drying SWNTs for carrying out the EDS experiment, SWNTs in their wet state were re-dispersed into various solutions and solvents of different compositions. In such a fashion, the dispersion of SWNTs becomes stable and the exfoliation state can be maintained, as can be supported by Raman characterization to be shown in the next section.

Figure 4:
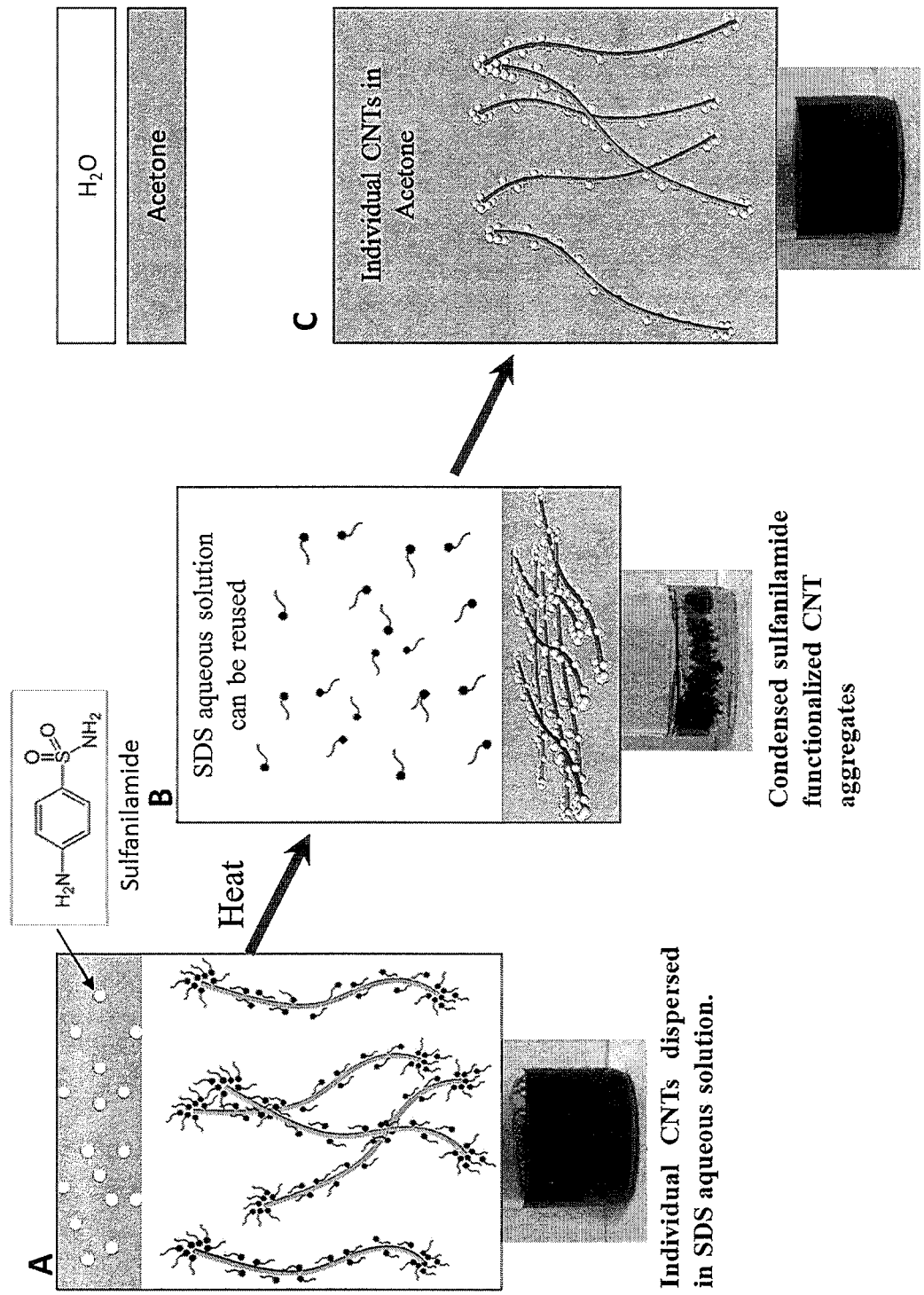
FIG. 4 illustrates the conceptual and realistic illustration of functionalization and transfer of individual CNTs from aqueous solutions to organic systems, where (A) concentrated acetone solution of sulfanilamide are added into SDS aqueous solution to functionalize individual CNTs, (B) the CNTs functionalized with sulfanilamide become insoluble in water and are condensed into acetone phase to form flocculation and (C) the CNT aggregates are redispersed into acetone under sonication.

A 2-in-1 step of functionalization and stabilization of individual CNTs into organic media: The functionalization mechanisms and processes are depicted in FIG. 4. Concentrated solution of sulfanilamide in acetone (10%) or other functionalizing agents were added into the SWNTs/SDS solutions based on a 1:1 stoichiometry of the amine groups on sulfanilamide and carboxylic groups on SWNTs (FIG. 4A). The carbon and oxygen chemistry of CNTs were roughly determined by EDS and XPS. The mixture was kept at 70° C. overnight and SWNTs form flocculation, indicating the surface functionalization rendering them insoluble in water phase (FIG. 4B). SWNTs were then retrieved by filtration or centrifugation and extra SDS and unreacted sulfanilamide were washed away with alcohol. Acetone was used to re-disperse SWNT with sonication (FIG. 4C). SWNTs dispersion is found to be stable for at least two months. The CNT concentration in the dispersion remains stable at concentrations greater than about 600 ppm.

Incorporation of exfoliated CNT in epoxy: Individual CNT were functionalized with sulfanilamide, or other types of surfactants or curing agents, and dispersed in acetone. Additional curing agents and stoichiometric amount of epoxy were then added and sonicated. Acetone was removed using rotary evaporator after a stable dispersion of CNT in epoxy was achieved. The mixture was then cured for 8 hr at 140° C. and 2hr at 180° C. (EPON™ Resin 862 epoxy cured with sulfanilamide).

Neutralization (Re-protonation) and Purification of ZrP Nanoplatelets

After TBA$^+$OH$^-$, or other efficient basic exfoliating agents were used to exfoliate ZrP nanoplatelets, a sufficient amount of acid (e.g., HCl) was added in the dispersion to fully neutralize TBA, to re-protonate ZrP and to cause precipitation of nanoplatelets. The coagulated nanoplatelets were washed 3 or 4 times with DI H$_2$O to remove additional acids.

Solvent Stabilization of Purified ZrP Nanoplatelets

After the nanoplateles were neutralized and purified, the re-aggregated nanoplatelets were re-dispersed into mixtures of ethanol and DI H$_2$O with various volume ratios. A good solvent of DI H$_2$O and ethanol with volume ratio of 3:1 has been found to stabilize purified ZrP well without a need for additional additives, including surfactants.

Sorting of SWNT Using Purified ZrP Nanoplatelets

Using the similar approaches described above to get the purified α-ZrP, a mixture of exfoliated SWNT and purified nanoplatelets was obtained and aggregated. A sufficient amount of HCl was used in the re-aggregation process or afterwards to strip off most TBA. The SWNT-ZrP aggregates were washed with DI H$_2$O for 3 or 4 times and redispersed into 1% Triton containing solution, which was comprised of a mixture of ethanol and DI H$_2$O with a volume ratio of 1:3. The SWNT-ZrP dispersion was then centrifuged at 16,800 G for 1 hr. Supernatant and precipitates were collected separately after centrifugation and characterized with Raman spectroscopy.

Debundling/Disentanglement of CNT Using ZrP Nanoplatelets Deprotonated by KOH(ZrP—K) and Recycling of ZrP Nanoplatelets Preparation of ZrP—K Nanoplatelets and Debundling/Disentanglement of CNT After purification, the neutralized ZrP nanoplatelets were immersed in 100 mM KOH aqueous solution for 30 min and washed with DI H$_2$O for 3 or 4 times to remove additional KOH. The modified nanoplatelets containing the K$^+$ in the ZrP structure were then redispersed into DI H$_2$O via sonication. SWNT and K$^+$ functionalized ZrP nanoplatelets were mixed at a mass ratio of 1:5, followed by sonication. TEM was used to characterize the exfoliation state of SWNT.

Recycling of ZrP Nanoplatelets for CNT Dispersion

As illustrated in FIG. 1, step 3, the CNT-nanoplatelet mixture was separated into two phases after addition of acid/ion and surfactant with centrifugation. Most CNT were retrieved in the supernatant phase. The precipitant phase has a gel-like appearance, which contains precipitated nanoplatelets and a small amount of CNT. The gel-like phase was washed with DI $H_2O$ for 3 or 4 times to remove residue of acid/ion and surfactants, followed by immersion in 100 mM KOH aqueous solution of 30 min. Afterwards, extra KOH was removed by washing again with DI $H_2O$ and the nanoplatelets de-protonated again with the assistance of KOH, were redispersed in DI $H_2O$ via sonication. Oxidized CNT bundles were then added to the reactor to begin another cycle of CNT debundling and disentanglement process.

Characterization and Analysis.

Spectroscopic characterization of the dispersion state of HiPco SWNTs exfoliated by ZrP nanoplatelets: The absorption spectra of the CNTs in water were recorded on a Hitachi (Model U-4100) UV-vis-NIR spectrophotometer. Raman spectra of CNTs were carried out using a Horiba JY LabRam spectrometer. EDS pattern and SEM images were obtained on a FEI Quanta 600 field emission SEM (FE-SEM). TEM micrographs were acquired with a high resolution JEOL 2010 microscope.

Figure 5:
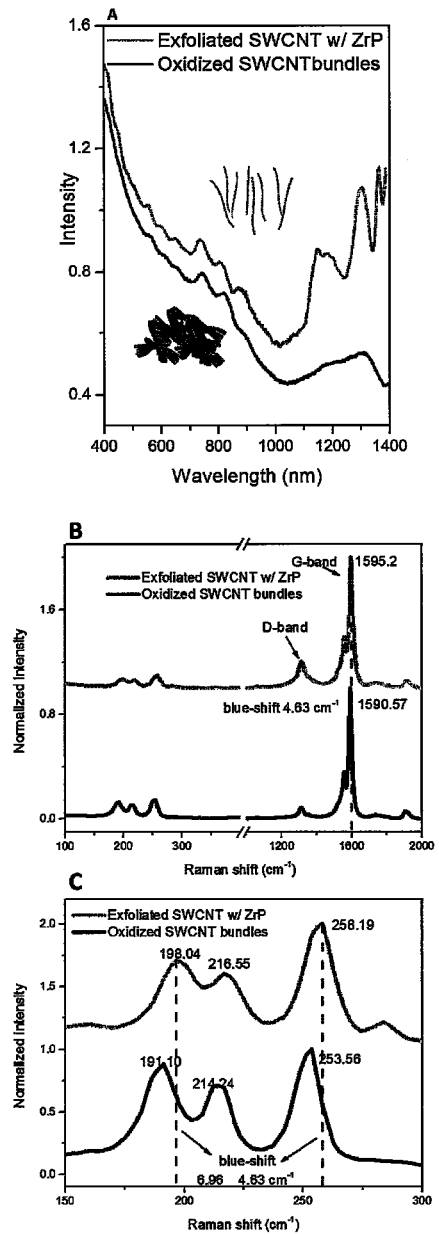
FIG. 5 illustrates the analysis curves including (A) UV-vis-NIR, (B) Raman spectra, and (C) the RBM region of SWNTs Raman spectra before and after nanoplatelets-assisted debundling. Black lines represent pre-treated SWNTs bundles. Gray lines represent SWNTs exfoliated with ZrP nanoplatelets. The weight ratio of CNTs and ZrP is 1 to 5.

UV-vis-NIR spectroscopy of HiPco SWNTs before and after ZrP-assisted exfoliation: UV-vis-NIR spectroscopy is one of the most widely used tools to study SWNTs. FIG. 5A shows the UV-vis-NIR spectra of SWNTs before and after ZrP-assisted exfoliation. The more distinct and narrower van Hove transition peaks with increased intensity in the NIR range and the blue-shifted absorption peaks in UV-visible range of SWNTs after ZrP-assisted exfoliation suggest that SWNTs are most likely individually dispersed.

Raman spectroscopy of HiPco SWNTs before and after ZrP-assisted exfoliation: The Raman spectra of SWNTs comprises three distinguished regions: 180-300 $cm^{-1}$, the Radial Breathing Modes (RBM); ~1300 $cm^1$, the defect band (D-band); and ~1600 $cm^{-1}$, the tangential G-mode (G-band). D-band indicates the defects on the sidewalls of SWNTs. FIG. 5B shows the Raman spectra of SWNTs before and after ZrP-assisted debundling. The intensity of D-band of SWNTs increases after debundling and the peak is sharpened, suggesting that more surface area of SWNTs are exposed to Raman laser after exfoliation. The blue-shifting (around 5 $cm^{-1}$) of G-band of ZrP-treated sample indicates that the side-walls are relatively free of vibration compared with their bundled form, which means SWNTs are most likely exfoliated. The blue-shifting is also observed in RBM (Radial Breathing Mode) region as shown in FIG. 5C.

Separation efficiency of ionic screening method: Table 1 lists the experimental conditions, separation efficiency, and yield of different methods. Ionic screening method uses low concentration of ions (10 mM for monovalent ions) to precipitate SWNTs while ZrP is left in the supernatant and no surfactant is involved. SWNTs were then collected by low-speed centrifugation (1,500 G for 5 minutes) and dispersed via sonication. Then, another cycle of ion addition, centrifugation, and dispersion were carried out. Based on weighing the ZrP residue left in the supernatant, the separation efficiency of the ionic screening method was measured to be larger than 90% in our previous report. However, EDS shows that the separation efficiency of the first screening cycle was only 55% and was increased to 85% after the second screening cycle. There was no significant improvement of the separation efficiency after the second cycle.

Separation efficiency and yield of salts/surfactants method: When using salts and surfactants to re-aggregate ZrP nanoplatelets, the surfactants used to stabilize CNTs must not be sensitive to ionic strength. As a result, nonionic surfactants like Triton and PVP are preferred, because most ionic surfactants are not stable at high ionic concentrations. When 1% Triton was used, the separation efficiency was almost 100% with a yield of 61%. The ability of PVP to stabilize CNTs is not as good as that of Triton, especially with MWNTs. When using the KCl/PVP method to separate ZrP nanoplatelets from MWNTs, at least a surfactant concentration of 2.5% is suggested for 80 ppm of MWNTs dispersion.

Ionic surfactants were found to be inefficient to separate CNT and ZrP when combined with ions. They either are not able to stabilize CNT in an ionic environment (e.g., sodium dodecylbenzenesulfonate (SDBS) at high ionic strength, cetrimonium bromide (CTAB) and SDS) or stabilize both CNT and ZrP at the same time (e.g., SDBS at low ionic strength). Multi-valent ions are known to be more effective for the ionic screening effect. High yield and high separation efficiency of CNT-nanoplatelet mixture are expected if divalent or trivalent ions and combined surfactants are used in the salts/surfactants method.

Figure 6:
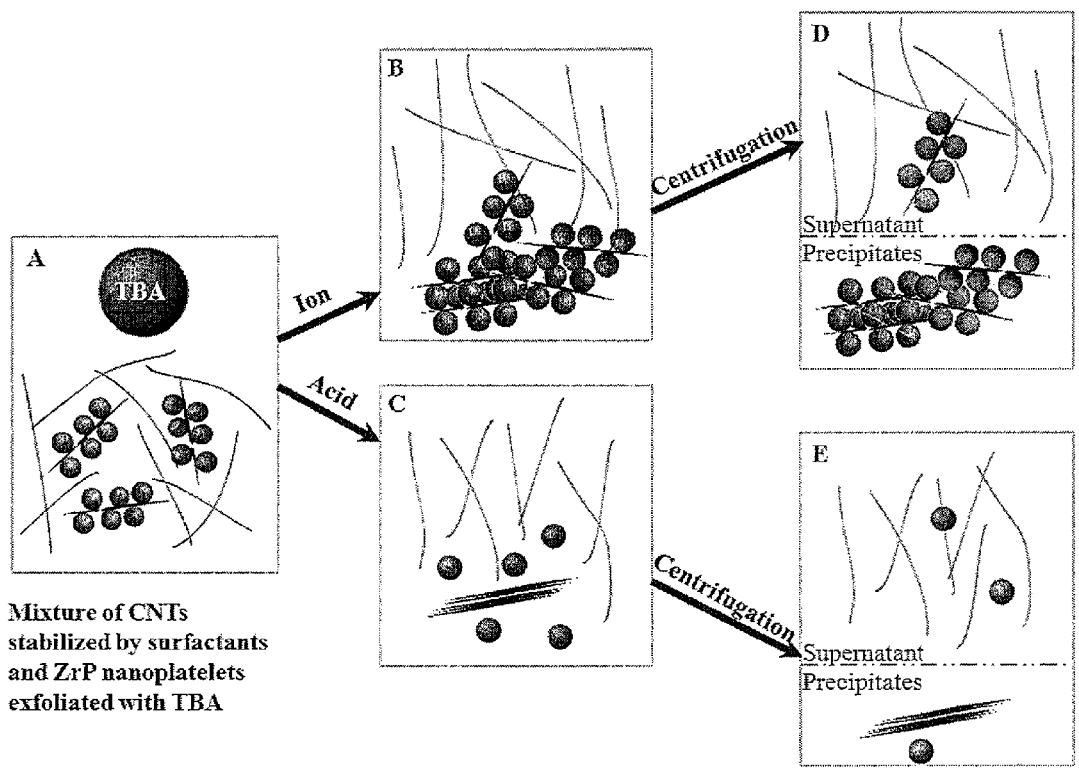
FIG. 6 illustrates (A) exfoliated ZrP nanoplatelets in CNT-nanoplatelet mixture aggregate under the effect of (B) strong ionic strength or (C) acidic condition, (D) the separation of ion-induced precipitates, or (E) acid-induced precipitates of nanoplatelets through centrifugation.

Separation efficiency and yield of acid/surfactants method: The efficiency of HCl/surfactants approach is even better than the above, with 100% separation efficiency and a higher yield. The improvement lies in the difference of the mechanism between ion-induced and acid-induced separation, as shown in FIG. 6. Exfoliated ZrP nanoplatelets are coated with TBA molecules and surrounded by an electrostatic sphere (FIG. 6A), which prevents nanoplatelets from aggregation. The presence of added ions shrinks the electrostatic spheres and causes the reaction-limited aggregation of ZrP nanoplatelets. However, TBA molecules are still likely bound onto the surfaces of ZrP nanoplatelets through ionic bonding, making the aggregates loosely packed (FIG. 6B). On the other hand, the scenario for HCl is very different. The acidity of HCl (pKa≈–6) is much stronger than that of $Zr(HPO_4)_2$ (pKa=12.3), $TBA^+OH^-$ is inclined to react with HCl rather than ZrP. Therefore, when HCl was added into a solution containing exfoliated ZrP nanoplatelets, TBA molecules would detach themselves from the nanoplatelets, rendering a more close-packed agglomeration of the nanoplatelets (FIG. 6C) and a more thorough separation from CNTs (100%, FIG. 6E), when compared with that of the KCl method (<100%, FIG. 6D).

Another advantage of the HCl/surfactants method is that the concentration of HCl used here is much lower (<2 mM) than the KCl concentration (>20 mM) used in the KO/surfactants method. The low ionic strength makes this method not only applicable to nonionic surfactants, such as PVP and Triton, but also anionic surfactants that are sensitive to ionic strength, like SDS and SDBS. Cationic surfactants like CTAB have a tendency to bind with ZrP nanoplatelets, instead of CNTs; therefore it is not effective. Theoretically, the maximum amount of HCl required to fully separate the ZrP nanoplatelets should not be more than the amount of TBA in the solution. However, other factors can affect the outcome and may require a higher concentration of HCl to show effectiveness.

When Triton is used to stabilize CNTs, the molar ratio of the actual HCl used to TBA for achieving 100% separation efficiency is slightly larger (1.13:1) than the theoretical value of 1:1, with a yield of 63%. This is possibly due to the composition complexity of the whole system with carboxylic groups of SWNTs (pKa ($CH_3COOH$)=4.75) and possible presence of residual metal catalysts from SWNTs synthesis, which will neutralize with the added acid.

When using SDS and HCl to separate ZrP and to stabilize CNTs, the molar ratio of the actual HCl to TBA used in the dispersion to achieve 100% separation efficiency is only 0.56:1, which is much less than that with Triton. We have noticed 1 that when SDS was added to the CNT-ZrP mixture, a small amount of precipitates would form before acid was added. This phenomenon is not seen when Trition is used. SDS is a type of ion composed of a weak dodecanol base and a relatively strong $NaHSO_4$ acid (pKa=1.9) and will hydrolyze to become acidic when dissolved in water when compared with $Zr(HPO_4)_2$. It is likely that SDS can cause partial detachment of TBA from the nanoplatelets before acid is added. Another possible reason is that the addition of SDS increases the ionic strength in the CNT-ZrP mixture and destabilizes the ZrP before acid is added. Consequently, a considerable increase in the yield (up to 80%) of CNTs is achieved with only half of the theoretic and actual amount of HCl needed when Triton is used as the stabilizing surfactant.

Figure 7:
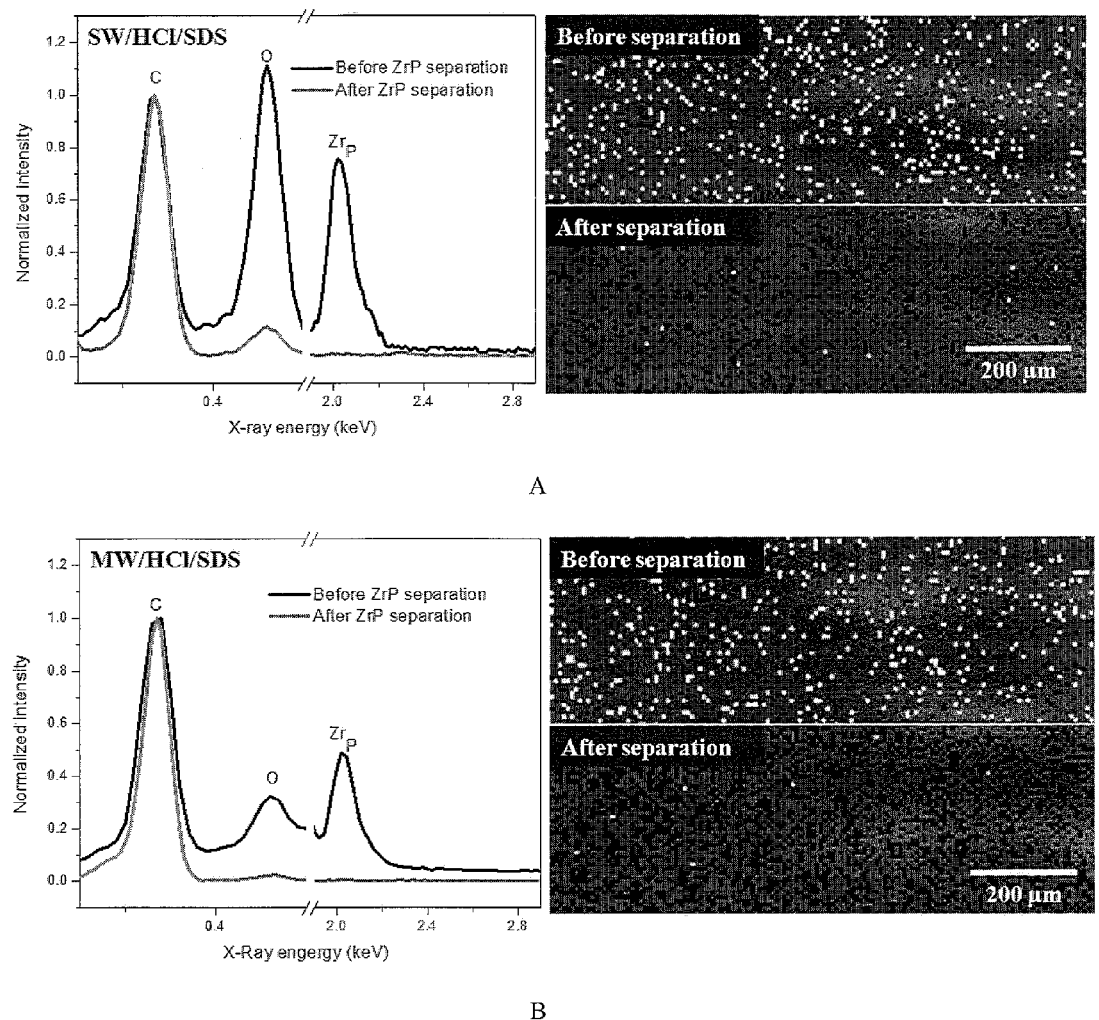
FIG. 7 illustrates EDS patterns and elemental mapping of (A) SWNTs and (B) MWNTs before and after ZrP separation using the HCl/SDS method. The dark dots indicate the signal from C-element and bright dots from P-element, wherein the background of the specimen mount has a gray color and should not be mixed with the bright dots.

FIG. 7 shows the EDS data and the elemental mapping of CNTs before and after ZrP separation using the HCl/SDS method for HiPco SWNTs (A) and MWNTs (B), respectively. The energy signal of the Zr ($L\alpha_1$=2.042 keV, online database of X-ray transition energies from National Institute of Standards and Technology) and P ($K\alpha_1$=2.014 keV) elements in the CNTs/ZrP mixture disappeared after the nanoplatelets separation procedure. The separation efficiency is 100% with a yield of over 70% after one cycle. There is no signal of Na ($k\alpha_1$=1.041 keV) element of SDS either, suggesting a complete SDS removal after washing CNTs with acetone and alcohols.

Figure 8:
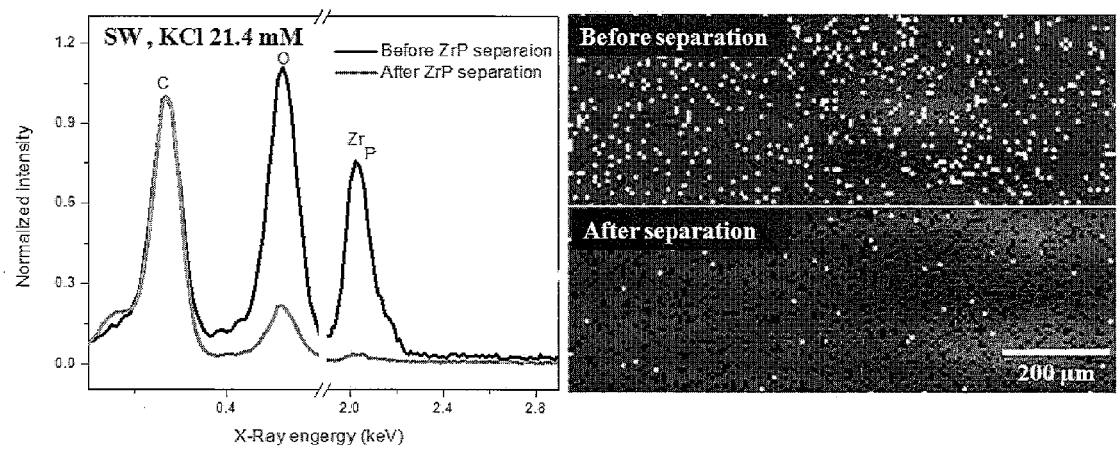
FIG. 8 illustrates EDS patterns and elemental mapping of (A) SWNTs and (B) MWNTs before and after ZrP separation using the KO/Triton method, and the dark dots indicate the signal from C element and bright dots from P element
Figure 8:
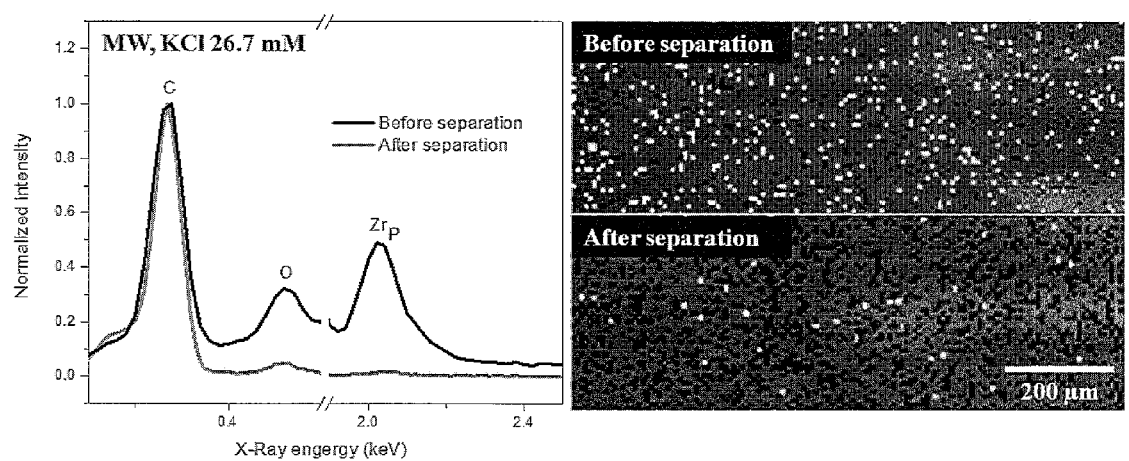

FIG. 8 shows the EDS data and elemental mapping of HiPco SWNTs (A) and MWNTs (B) after ZrP removal using the KO/triton method. The separation efficiency is nearly 100%, indicated by a very weak signal from Zr and P elements. Yet, the yield is 61%, which is less than that of the HCl/SDS method and is similar to HCl/Triton method.

Separation efficiency and yield of the combination of ionic screening and acids/surfactants (or ions/surfactants) methods: One phenomena we have noticed is that when the first cycle yield increase with decreasing nanoplatelets amount in the SWNT-nanoplatelet mixture. For example, when the weight ratio of SWNT and ZrP are reduced to 1 to 1 instead of 1 to 5, the first cycle yield to retrieve CNTs using the HCl/SDS method can be greatly improved to over 90%. However, it is also noted that full exfoliation of SWNTs is more likely when more nanoplatelets are incorporated. In order to achieve a high yield and good CNTs exfoliation, we first use the ionic screening approach to remove most of the nanoplatelets from a mixture of SWNTs and ZrP with a weight ratio of 1 to 5. SWNTs aggregates with trapped nanoplatelet were then collected and redispersed in SDS solution, followed by ZrP precipitation using HCl. In this fashion, over 90% of individual SWNTs can be stabilized by SDS in the supernatant. Compared with using multiple cycles to achieve higher yield for SWNT retrieval, the above combined process is more simple and effective. The ionic screening method can also be combined with the salts/surfactants method to increase the $1^{st}$ cycle yield, in which case the SWCNT precipitated by ions, along with trapped ZrP, were redispersed in aqueous solutions of nonionic surfactants and additional ions were used to remove ZrP completely.

Figure 9:
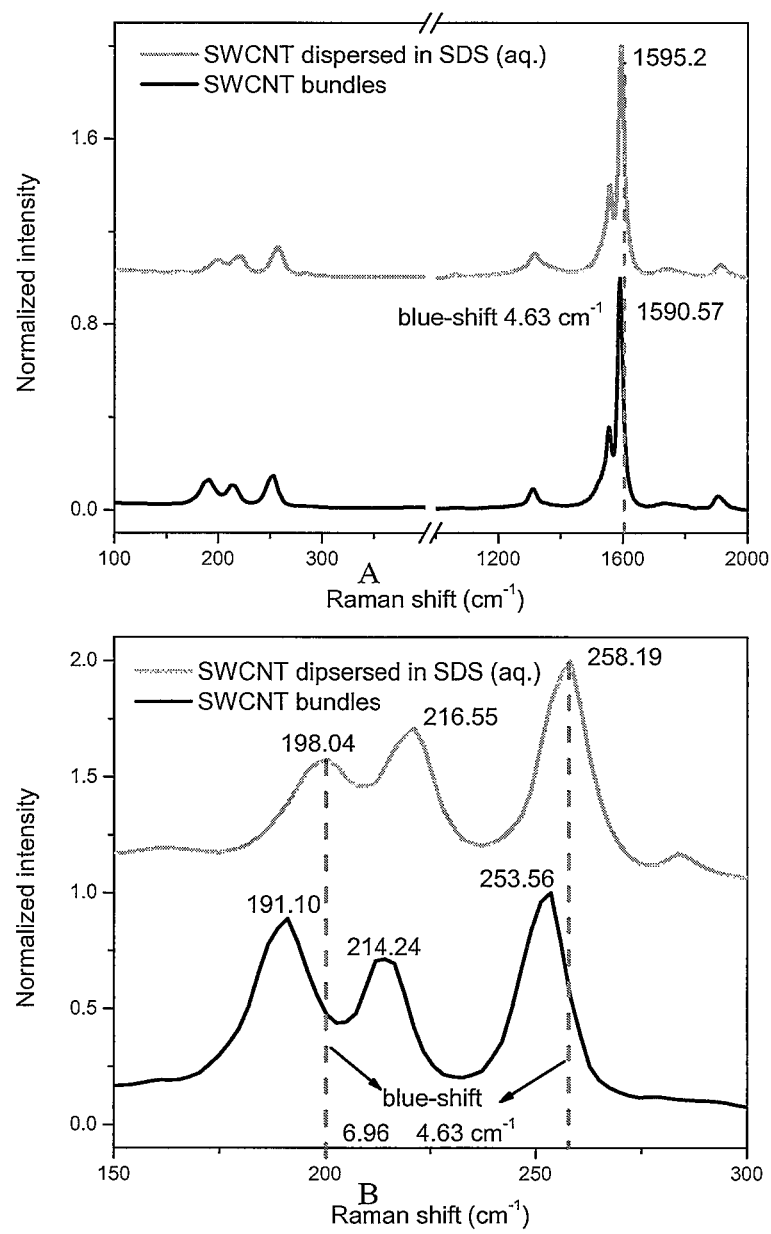
FIG. 9 illustrates (A) Raman spectra and (B) RBM region of SWNTs stabilized in SDS aqueous solution after ZrP-assisted exfoliation and ZrP removal compared with those of pre-SWNTs.
Figure 10:
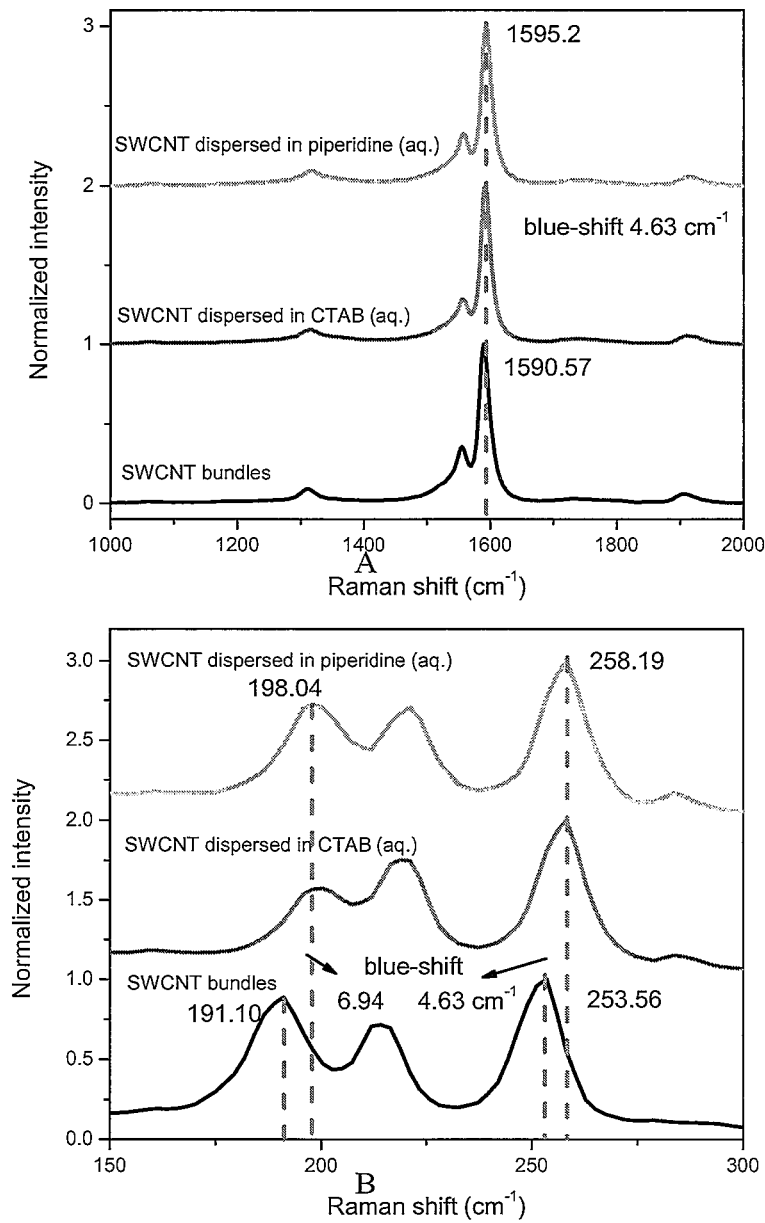
FIG. 10 illustrates Raman spectra (A) and RBM region (B) of SWNTs transferred into piperidine and CTAB solutions after ZrP-assisted exfoliation and ZrP and SDS removal, compared with those of pre-treated SWNTs.

Raman spectra of individual HiPco SWNTs after nanoplatelets separation: FIG. 9 shows the (A) Raman spectra and (B) RBM region of HiPco SWNTs stabilized in SDS aqueous solution after ZrP-assisted exfoliation and ZrP removal compared with those of pre-treated SWNTs. FIG. 10 shows the (A) Raman spectra and (B) RBM region of HiPco SWNTs transferred into piperidine and CTAB solutions after ZrP-assisted exfoliation, ZrP removal and SDS removal, compared with those of pre-treated SWNTs bundles. From the blue-shifting of G-band and in the RBM region, we can tell that the dispersion state obtained through ZrP-assisted exfoliation is well maintained after ZrP separation.

Elemental Analysis of ZrP Nanoplatelet and its Derivatives

XPS was used to quantify the chemical composition of the functionalized ZrP nanoplatelets and their derivatives. Table 2 lists the atomic ratio of Zr, P, K (if any), O, and C elements of differently treated nanoplatelets, while normalized by the amount of Zr element. The superscripts "e" denote the experimental value and the superscripts "t" denote the theoretical value of the chemical structures of $Zr(PO_4)_2K_2$ (ZrP—K), $Zr(HPO_4)(PO_4)$—$C_{16}H36$ (ZrP-TBA conjugated at molar ratio of 1:1), and $Zr(HPO_4)_2.H_2O$ (i.e., purified ZrP) nanoplatelets. The large C content in ZrP-TBA nanoplatelet is obviously from the TBA molecule. After using a sufficient amount of acid to neutralize TBA, the C content is significantly reduced in the purified ZrP nanoplatelets, indicating the detachment of a significant portion of TBA molecules from the nanoplatelet surfaces. A comparable amount of K to that of P and Zr in ZrP—K nanoplatelet verifies the presence of $K^+$ on the nanoplatelet structure. The chemical structure of the product is likely to be $Zr(PO_4)_2K_2$ after the $HPO_4^{2-}$ reaction with KOH. The quantification of chemical structure of different treated nanoplatelets allows the comparison of their mechanisms to exfoliate CNT. It is noted that the mass ratio of CNT and nanoplatelets in this work refers only to the content of ZrP ($Zr(HPO_4)_2.H_2O$) whether or not ion or TBA molecule is incorporated.

TABLE 2

Chemical Composition of Different Nanoplatelets.

| Atomic ratio | $P^e/P^t$ | Zr | $K^e$ | $O^e/O^t$ | $C^e/C^t$ |
|---|---|---|---|---|---|
| ZrP—K | 1.5/2 | 1 | 1.6 | 7.4/9 | 3.4/0 |
| ZrP-TBA | 2.0/2 | 1 | — | 8.7/9 | 13/12.8 |
| ZrP | 1.9/2 | 1 | — | 8.4/9 | 5.6/0 |

Solvent-stabilization of Derivatives of ZrP

Figure 11:
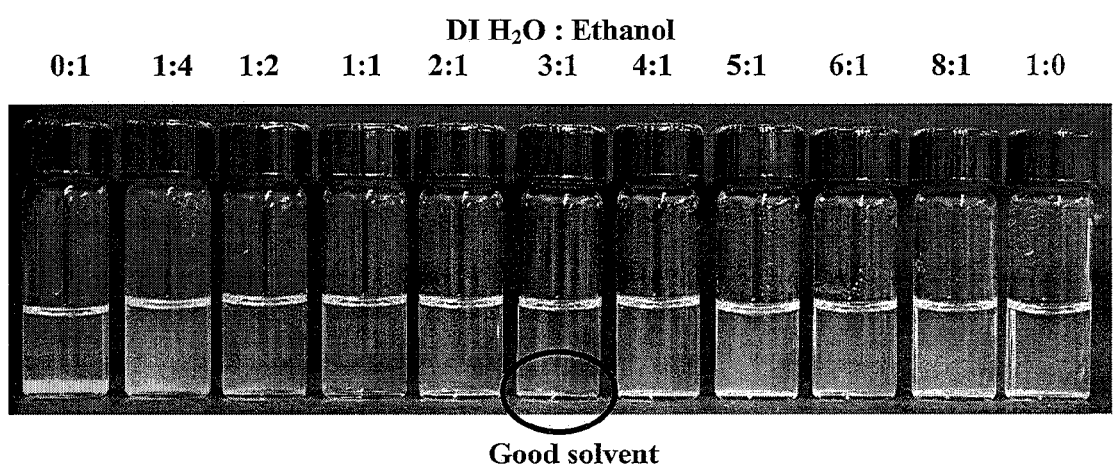
FIG. 11 illustrates the visual appearance of purified ZrP dispersions in different ratio concentrations of water to ethanol.

FIG. 11 shows visual image of purified ZrP nanoplatelet dispersion (500 ppm) in water prepared by exfoliating ZrP nanoplatelet with TBA, TBA neutralization with acid, and redispersion in mixtures of DI $H_2O$ and ethanol with different volume ratios after sonication. It has been found that with 3:1 volume ratio of DI $H_2O$ and ethanol, the dispersion has the best transparency and stability. Pristine ZrP nanoplatelets, without TBA-assisted exfoliation, however, cannot be dispersed and stabilized in this mixture even its chemical composition is the same as that of purified nanoplatelets. The results indicate that exfoliated nanoplatelets do not restack into a highly ordered layered structure even after the removal of the dispersing ligand. On the contrary, the ligand-free nanoplatelet aggregate forms loosely packed structure in its wet state. The composition of the dispersing media may be varied but the principle of dispersing the nanoplatelets without using surfactants is to match the polarity (e.g., by matching the dielectric constant) of the solvent to that of the nanoplatelet. Similar principle can also be applied to surfactant-free ZnO quantum dots and CNT. The neutralized nanoplatelet stabilized solely by solvent shows different stability to the positively charged nanoplatelet (e.g., nanoplatelets associated with $TBA^+$) stabilized by electrostatic repulsion. While the neutralized nanoplatelet, if undisturbed, can be stabilized in a polarity-matched solvent for months without precipitation, they can be easily re-aggregated by centrifugation. This phenomenon allows for sorting of SWNT based on the neutralized nanoplatelets mentioned above.

Affinity of CNT to Different Derivative Nanoplatelets and SWNT Sorting

The purified ZrP nanoplatelets tend to interact differently with CNT of different chirality. While ZrP-TBA can be used to obtain fully debundled SWNT dispersion, we have discovered that the purified nanoplatelets will only interact with a fraction of oxidized SWNT and form a stable solution. Raman spectroscopy shows that the stabilized portion of the solution and the non-interacted portion SWNT exhibit different electronic structures. However, the sorting effect is not very obvious, possibly because most SWNT are still in the bundled form.

Figure 12:
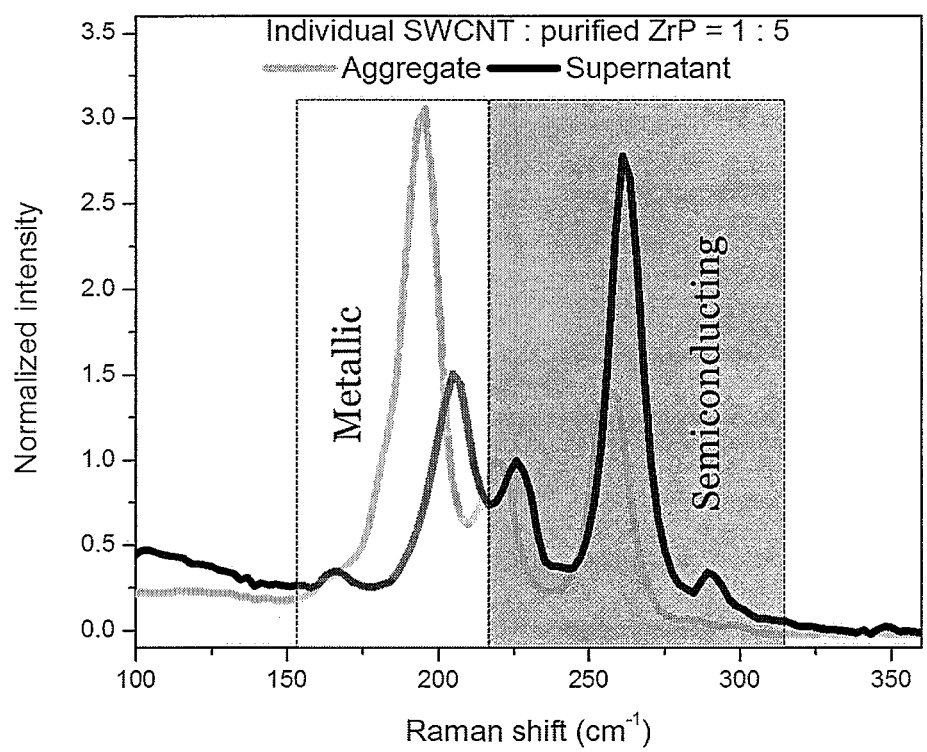
FIG. 12 illustrates the Raman spectra of supernatant and aggregated separated from a mixture containing SWNTs, Triton and exfoliated, purified ZrP nanoplatelets.

In order to examine the nanoplatelet sorting effect on individually dispersed SWNT, ZrP-TBA nanoplatelet dispersion was used to exfoliate SWNT first and then purified with acid. After centrifugation, all SWNT and nanoplatelets precipitate into a gel form, containing mainly exfoliated SWNT and purified ZrP nanoplatelets. Similar to purified ZrP nanoplatelets alone, the gel-like mixture of exfoliated SWNT and purified nanoplatelets can be redispersed in a mixture of DI H2O and ethanol with volume ratio of 3:1. Triton was then added to stabilize certain types of SWNT before centrifugation; while the SWNT with better affinity to purified ZrP nanoplatelets would precipitate under centrifugation. Raman spectra of the supernatant portion and the precipitated portion after 1 hr centrifugation at 16,800 G show the distinct electronic structure of metallic SWNT attached to the purified ZrP nanoplatelets, and most of the semiconducting SWNT remained in the supernatant as shown in FIG. 12.

ZrP-TBA and ZrP—K nanoplatelets behave very similarly in dispersing CNT. The easy preparation of ZrP—K nanoplatelets from other derivatives of nanoplatelets gives rise to the recyclability of ZrP in dispersing CNT. Preliminary results show that after CNT retrieval from CNT-ZrP(-TBA) mixture using ion/acid and surfactants, the precipitated nanoplatelet gel can be used to prepared ZrP—K nanoplatelets (or a mixture of ZrP—K and ZrP-TBA nanoplatelets, depending how much TBA is removed during the re-aggregation of nanoplatelets) and re-used to disperse CNT. Preliminary results show that after CNT retrieval from CNT-ZrP(-TBA) mixture using ion/acid and surfactants, the precipitated nanoplatelet gel can be isolated and deprotonated again even with the CNT trapped inside. Since the nanoplatelet in the gel-from aggregate is not likely to restack into a close-packed structure, exfoliation agent with a big molecular sized like TBA$^+$OH$^-$ is no longer necessary. Small basic molecules like KOH have then been used to prepare exfoliated ZrP—K nanoplatelets to disperse more CNT. To be noticed is that the nanoplatelets separated from CNT by ion/surfactant method should be easier to redisperse than those separated using acid/surfactant method since the former is likely to have more TBA molecules attached to the nanoplatelet surface than the latter.

Figure 13:
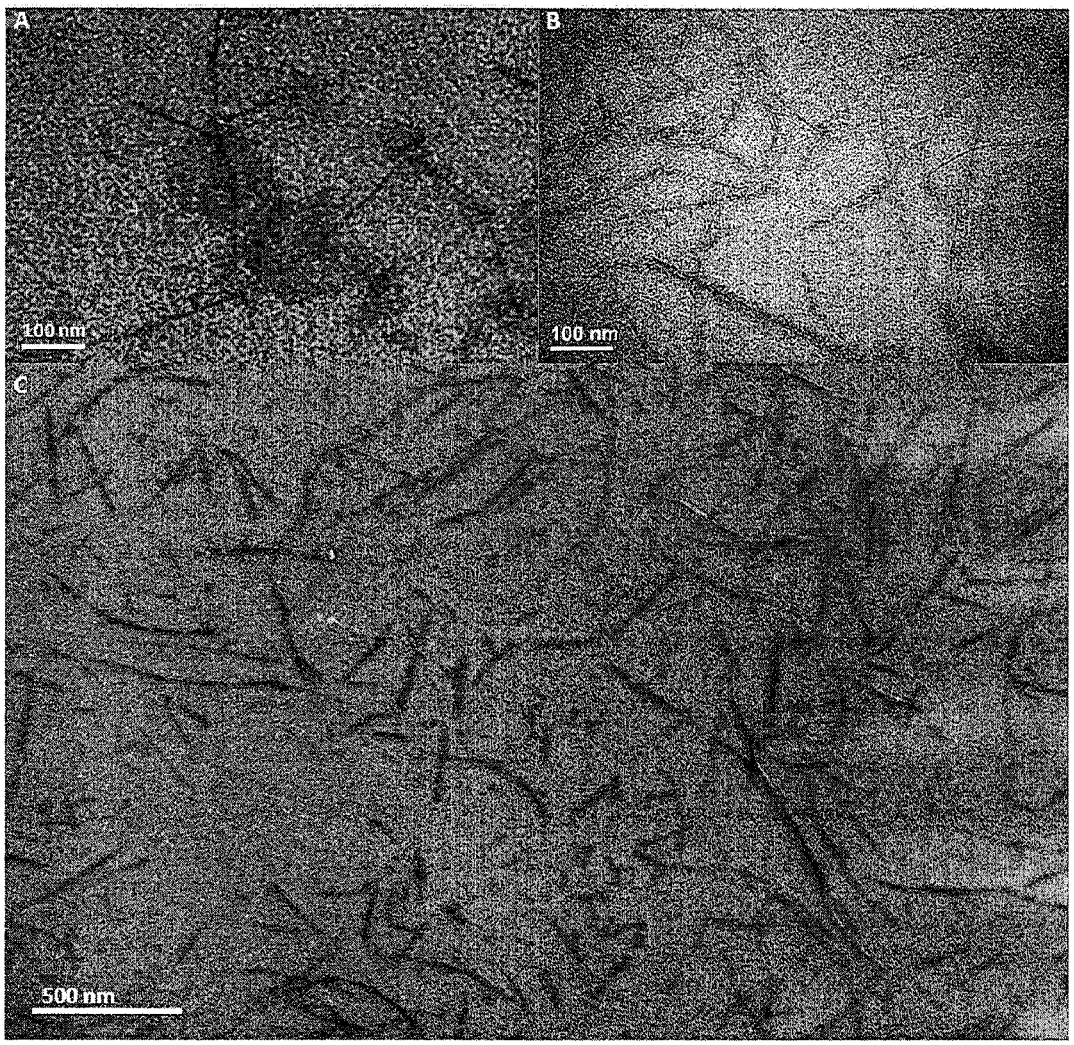
FIG. 13 illustrates TEM micrographs of (A) SWNTs exfoliated with ZrP nanoplatelets and (B) SWNTs separated from nanoplatelets, (C) SEM micrographs of SWNTs transferred into PSS aqueous solution.
Figure 14:
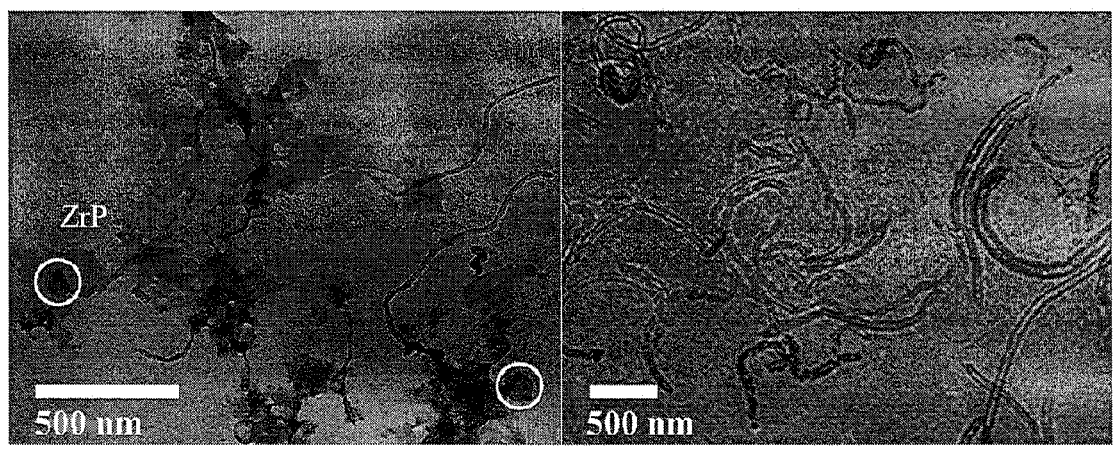
FIG. 14 illustrates TEM micrographs of disentangled MWNTs before (A) and after (B) ZrP separation. For clarity, two of the many ZrP nanoplatelets are circled in FIG. 14A.

Microscopy of exfoliated HiPco SWNTs before and after nanoplatelets removal: FIGS. 13A and 13B show the TEM micrographs of individual SWNTs before and after ZrP separation using HCl/SDS method, SWNTs exhibit individually exfoliated state and has a diameter of about 1.5 nm. The nanoplatelets bound to SWNTs (FIG. 13A) are completely removed after ZrP separation (FIG. 13B). FIG. 13C shows the SEM of individual SWNTs transferred into 0.25% polystyrene sulfonate sodium (PSS) solution. SWNTs in the image have a defused morphology and appear broader in diameter because of the PSS coating on the SWNTs surface. Similarly, FIG. 14 illustrates TEM micrographs of disentangled MWCNT before (FIG. 14A) and after ZrP separation (FIG. 14B).

Figure 15:
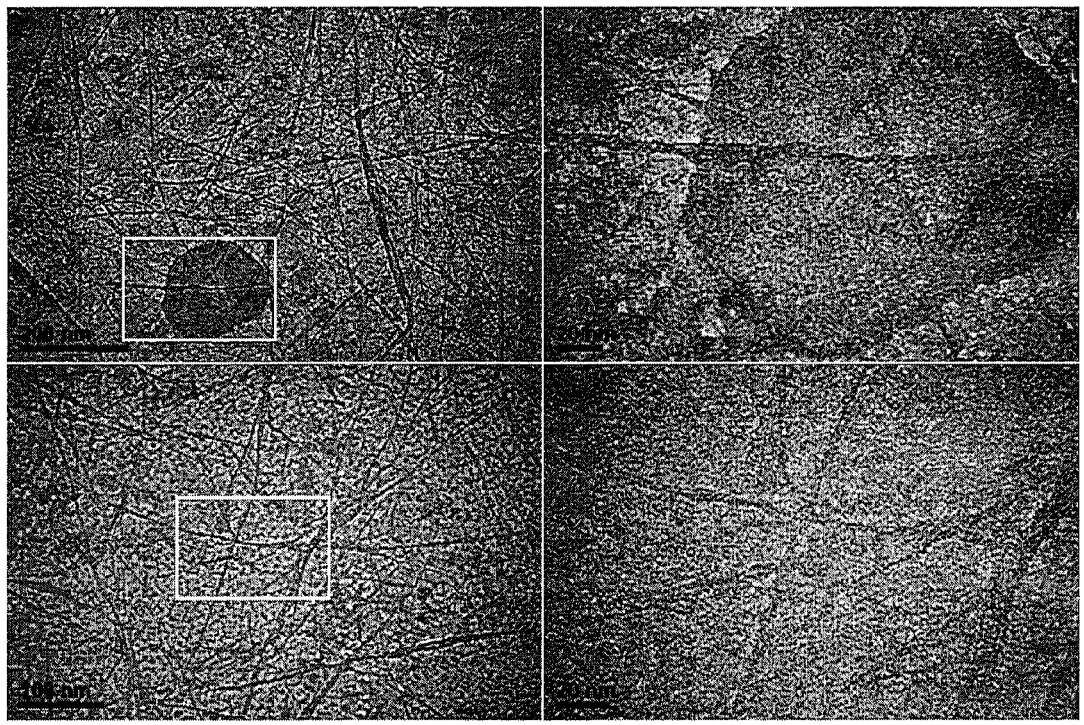
FIG. 15 illustrates TEM micrographs of SWNT and $K^+$ ionized ZrP nanoplatelets in a 1:5 mass ratio.

Microscopy of SWNT dispersed using ZrP—K nanoplatelets: FIG. 15 presents the morphology of the mixture of SWNT and ZrP—K nanoplatelets with a 1:5 calculated mass ratio of SWNT and ZrP (Zr(HPO$_4$)$_2$.H$_2$O), with most SWNT debundled and a small fraction of bundled SWNT. With further optimization, ZrP—K nanoplatelet is expected to be able to fully debundle CNT.

Microscopy of exfoliated XD-CNTs after nanoplatelets removal and sulfanilamide functionalization: All the work described above about HiPco SWNTs has been extended to the case of XD-CNTs and MWNTs with equal success. XD-CNTs are suitable for visualization after sulfanilamide-functionalization with a diameter of around 5 nm and are economical for preparing polymer nanocomposites. To make an XD-CNTs/epoxy nanocomposite, pre-treated XD-CNTs has been exfoliated with and then separated from ZrP nanoplatelets using the HCl/SDS method, followed by sulfanilamide treatment in SDS solution and redispersion into acetone. One advantage of this functionalization procedure is that the removal of SDS and functionalization of exfoliated CNTs can be achieved at the same time, avoiding extra steps of surfactants removal. The use of sulfanilamide and acetone here is a representation of a simple method of functionalization and transferring individual CNTs into organic and polymeric media. Another example is by functionalizing CNTs with alkylamine or alkanol, individual CNTs can become soluble even in nonpolar solvents.

Figure 16:
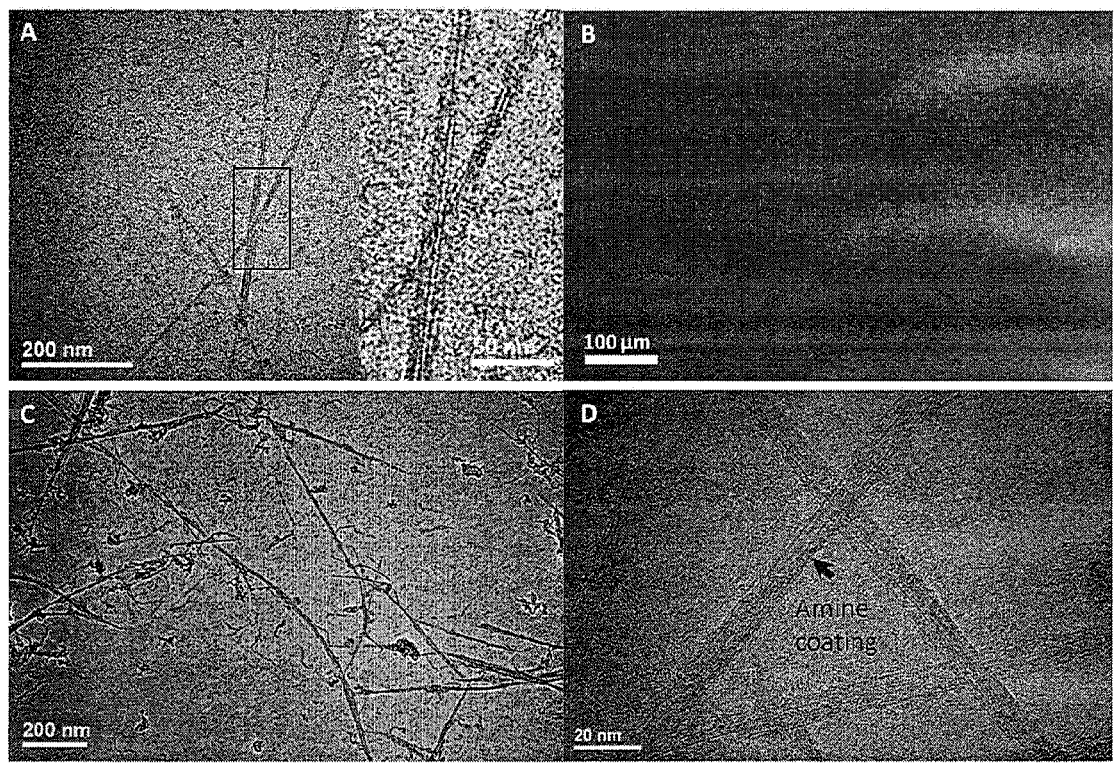
FIG. 16 illustrates (A) TEM micrograph of individual XD-CNTs separated from nanoplatelets and dispersed in SDS aqueous solution, (B) OM image of sulfanilamide-functionalized XD-CNTs dispersed in acetone, (C) low magnification TEM and (D) high magnification TEM micrographs of functionalized XD-CNTs.

FIG. 16A shows TEM of isolated XD-CNTs dispersed in SDS solution; no nanoplatelet is observed. The inset is a high magnification image, illustrating the overlap of two individual XD-CNTs with a SDS layer coated on the nanotube surfaces. FIG. 16B is OM of isolated XD-CNTs in acetone; no micro-sized aggregates can be seen. TEM (FIGS. 16C and 16D) also show that XD-CNTs are individually exfoliated in acetone with amine coating of several sites. The dispersion of XD-CNTs in acetone is then mixed with epoxy containing acetone for making epoxy nanocomposites.

Fluorescent epoxy-SWNT nanocomposites: Fluorescence of SWNT in polymer matrix is usually suppressed due to the fact that current techniques of fabrication polymer-SWNT composite often involve severe chemical treatment of SWNT, which damages their electronic structure. The epoxy/SWNT nanocomposites fabricated using our approaches have been demonstrated to show fluorescent signal, suggesting minimal damage of the SWNT structure.

We claim:

1. A method, comprising:
  forming a nanocomposite solution, having at least one nanotube and at least one nanoplatelet, wherein the nanotube is exfoliated;
  mixing at least one surfactant to the nanocomposite solution;
  separating a nanocomposite, wherein the nanotube remains suspended in the surfactant solution, and the nanoplatelet is precipitated from the nanotube and surfactant solution; and
  isolating the nanotube in solution, wherein isolating the nanotubes in solution comprises destabilizing or functionalizing the nanotubes in solution, and dispersing the nanotubes in a solvent, wherein functionalizing the nanotubes comprises mixing a solution containing amines, amides, ions, or other organic or inorganic groups, wherein the solution comprises sulfanilamide.

2. The method of claim 1, wherein forming a nanocomposite solution further comprises:
  adding at least one nanotube to a first solution, wherein the first solution oxidizes the nanotube;

isolating the nanotube from the first solution and re-suspending the nanotube in aqueous solvent to form an oxidized nanotube solution;

adding at least one nanoplatelet to a second solution, wherein the second solution exfoliates the nanoplatelet, to form an exfoliated nanoplatelet solution; and mixing the oxidized nanotube solution and exfoliated nanoplatelet solution to form a nanocomposite solution comprising at least one exfoliated nanotube associated with the at least one nanoplatelet.

3. The method of claim 1, wherein mixing at least one surfactant to the nanocomposite solution comprises adding at least surfactant chosen from the group consisting of anionic surfactants, cationic surfactants, and combinations thereof.

4. The method of claim 1, wherein mixing at least one surfactant to the nanocomposite solution comprises adding the surfactant to a concentration by weight between 0.01 wt % and 10 wt %.

5. The method of claim 4, further comprising mechanically agitating the nanocomposite solution during the step of mixing at least one surfactant to the nanocomposite solution.

6. The method of claim 1, wherein separating the nanocomposite further comprises mixing at least one ionic solution.

7. The method of claim 6, wherein separating the nanocomposite further comprises precipitating the nanoplatelets by the ionic solution.

8. The method of claim 7, wherein precipitating the nanoplatelets further comprises dissociating the nanoplatelets from the nanotubes.

9. The method of claim 6, wherein the at least one ionic solution further comprises an acid solution.

10. The method of claim 9, wherein the acid solution has a concentration of between 0.1 mM and 900 mM.

11. The method of claim 1, wherein isolating the nanotubes in solution further comprises one process chosen from the group consisting of settling, filtering, centrifuging, drying and combinations thereof.

12. The method of claim 11, wherein centrifuging the solution comprises a relative centrifugal force of at least 5,000 G.

13. The method of claim 1, wherein dispersing the nanotubes in a solvent further comprises:
washing the nanotubes;
filtering the nanotubes from solution;
drying the nanotubes; and
redispersing the nanotubes in a solvent.

14. The method of claim 13, wherein washing the nanotubes further comprises removing surfactant solution and functionalizing solution residue.

15. The method of claim 1, further comprising:
collecting the at least one precipitated nanoplatelet;
re-suspending the nanoplatelet; and
recycling the nanoplatelet for mixing with at least one additional nanotube solution.

16. The method of claim 15, wherein re-suspending the nanoplatelet comprises re-exfoliating the nanoplatelet.

17. The method of claim 15, wherein recycling the nanoplatelet for mixing with at least one additional nanotube solution, further comprises sorting the nanotubes in the least one additional nanotube solution by nanotube affinity for the recycled nanoplatelets.

18. The method of claim 17, wherein sorting the nanotubes by affinity for recycled nanoplatelets comprises agglomerating metallic nanotubes with the recycled nanoplatelets.

19. The method of claim 1, further comprising mixing the isolated nanotubes in solution to a matrix, wherein the matrix comprises at least one chosen from the group consisting of liquids, oils, inks, conductive inks, polymers, epoxies, resins, waxes, alloys, nanoclays, or combinations thereof.

\* \* \* \* \*